US012578242B2

(12) United States Patent
Sun et al.

(10) Patent No.: US 12,578,242 B2
(45) Date of Patent: Mar. 17, 2026

(54) SENSOR ARRANGEMENT FOR SENSING FORCES AND METHODS FOR FABRICATING A SENSOR ARRANGEMENT AND PARTS THEREOF

(71) Applicant: MAX-PLANCK-GESELLSCHAFT ZUR FÖRDERUNG DER WISSENSCHAFTEN E. V., Munich (DE)

(72) Inventors: Huanbo Sun, Tübingen (DE); Georg Martius, Tübingen (DE); Katherine J. Kuchenbecker, Stuttgart (DE)

(73) Assignee: MAX-PLANCK-GESELLSCHAFT ZUR FÖRDERUNG DER WISSENSCHAFTEN E. V., Munich (DE)

( * ) Notice: Subject to any disclaimer, the term of this patent is extended or adjusted under 35 U.S.C. 154(b) by 247 days.

(21) Appl. No.: 18/271,342

(22) PCT Filed: Jan. 8, 2021

(86) PCT No.: PCT/EP2021/050230
§ 371 (c)(1),
(2) Date: Jul. 7, 2023

(87) PCT Pub. No.: WO2022/148541
PCT Pub. Date: Jul. 14, 2022

(65) Prior Publication Data
US 2024/0060836 A1 Feb. 22, 2024

(51) Int. Cl.
*G01L 1/24* (2006.01)
*G01L 5/00* (2006.01)

(52) U.S. Cl.
CPC ................ *G01L 1/24* (2013.01); *G01L 1/241* (2013.01); *G01L 5/0061* (2013.01)

(58) Field of Classification Search
CPC . G01L 1/24; G01L 1/241; G01L 1/247; G01L 1/248; G01L 5/0061
See application file for complete search history.

(56) References Cited

U.S. PATENT DOCUMENTS

| | | | |
|---|---|---|---|
| 11,953,351 | B2 | 4/2024 | Kato et al. |
| 2009/0315989 | A1 | 12/2009 | Adelson |
| 2012/0240691 | A1 | 9/2012 | Wettels et al. |
| 2018/0005005 | A1 | 1/2018 | He et al. |

(Continued)

FOREIGN PATENT DOCUMENTS

| | | |
|---|---|---|
| JP | 2011007557 A | 1/2011 |
| JP | 2017058186 A | 3/2017 |

(Continued)

OTHER PUBLICATIONS

Japanese Office Action for Japanese Patent Application No. 2023-535453 dated Feb. 27, 2025 (3 pages).

(Continued)

*Primary Examiner* — Paul M. West
(74) *Attorney, Agent, or Firm* — REISING ETHINGTON, P.C.

(57) ABSTRACT

The disclosure relates to a sensor arrangement for sensing forces, including a measurement surface and optical detection of reflected light. The disclosure relates further to corresponding fabrication methods.

21 Claims, 11 Drawing Sheets

(56) References Cited

U.S. PATENT DOCUMENTS

2020/0139543 A1* 5/2020 Saito ........................ B25J 15/10
2021/0072101 A1  3/2021 Kato et al.

FOREIGN PATENT DOCUMENTS

| JP | WO2020166185 A1 | 9/2021 |
| WO | WO2013072712 A1 | 5/2013 |
| WO | WO2020017177 A1 | 1/2020 |

OTHER PUBLICATIONS

English Translation of Japanese Office Action for Japanese Patent Application No. 2023-535453 dated Feb. 27, 2025 (3 pages).
International Search Report for International Application No. PCT/EP2021/050230 dated Dec. 3, 2021 (6 pages).
Written Opinion for International Application No. PCT/EP2021/050230 dated Dec. 3, 2021 (16 pages).
Pedro Piacenza et al., "A Sensorized Multicurved Robot Finger with Datadriven Touch Sensing via Overlapping Light Signals", IEEE Transactions on Mechatronics, Apr. 1, 2020, Ithaca, NY (12 pages).
European Office Action for European Application No. 21700673.3 dated Sep. 30, 2025 (8 pages).

* cited by examiner

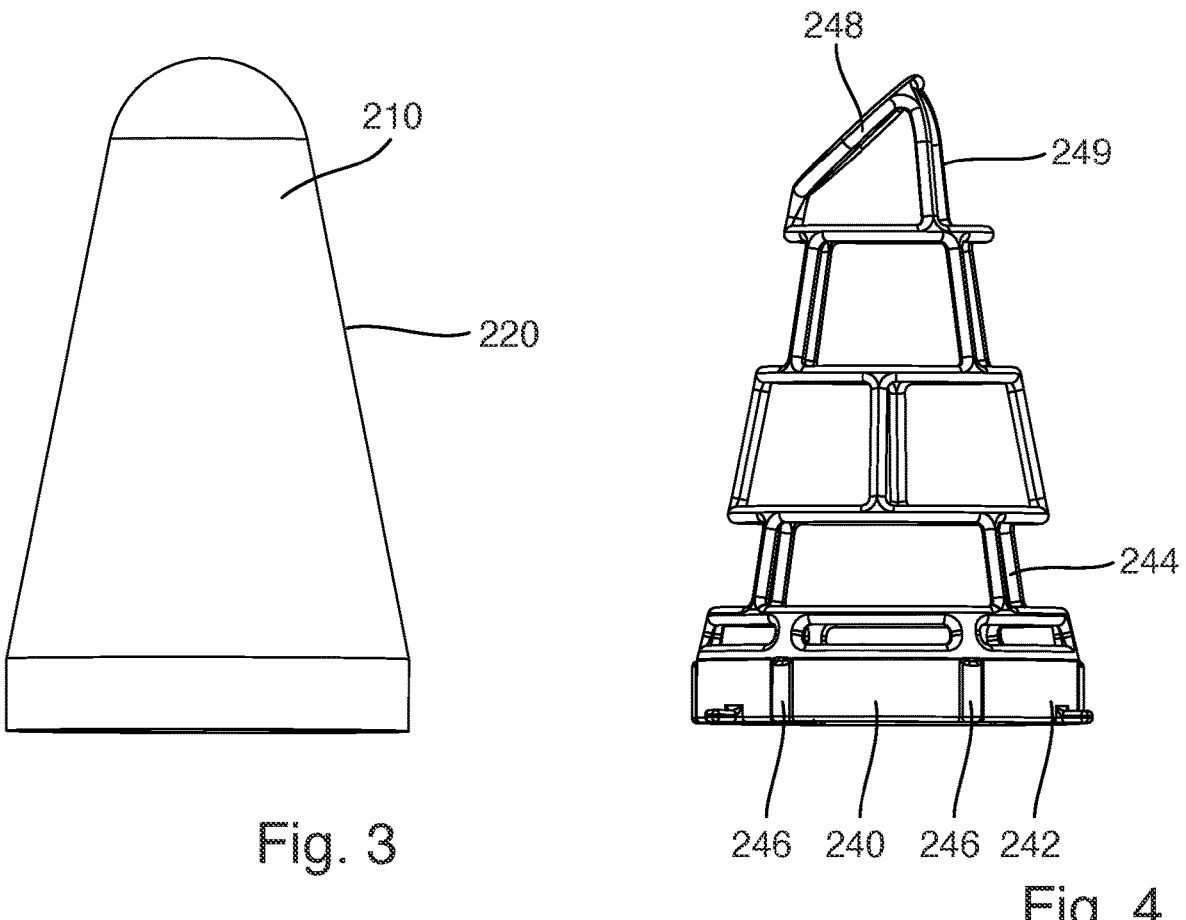
Fig. 3
Fig. 4
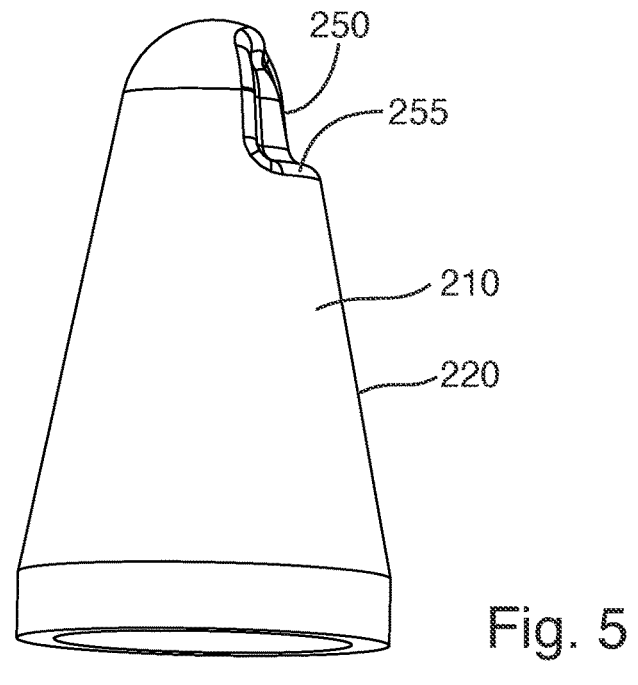
Fig. 5

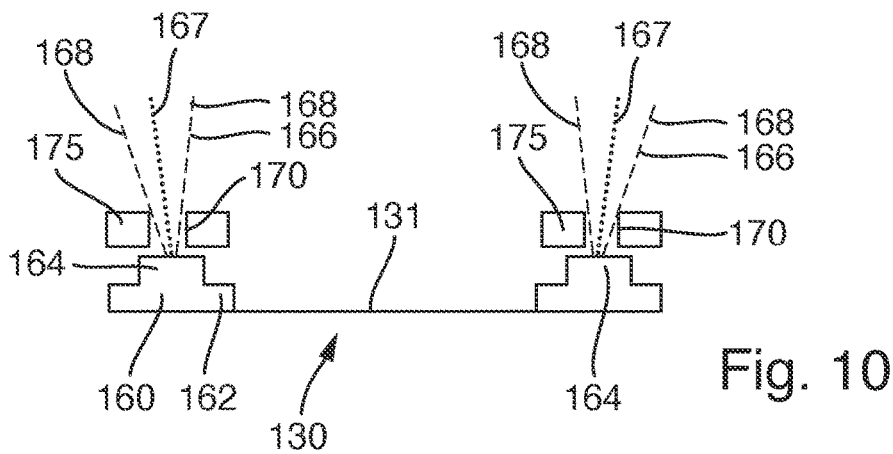
Fig. 10
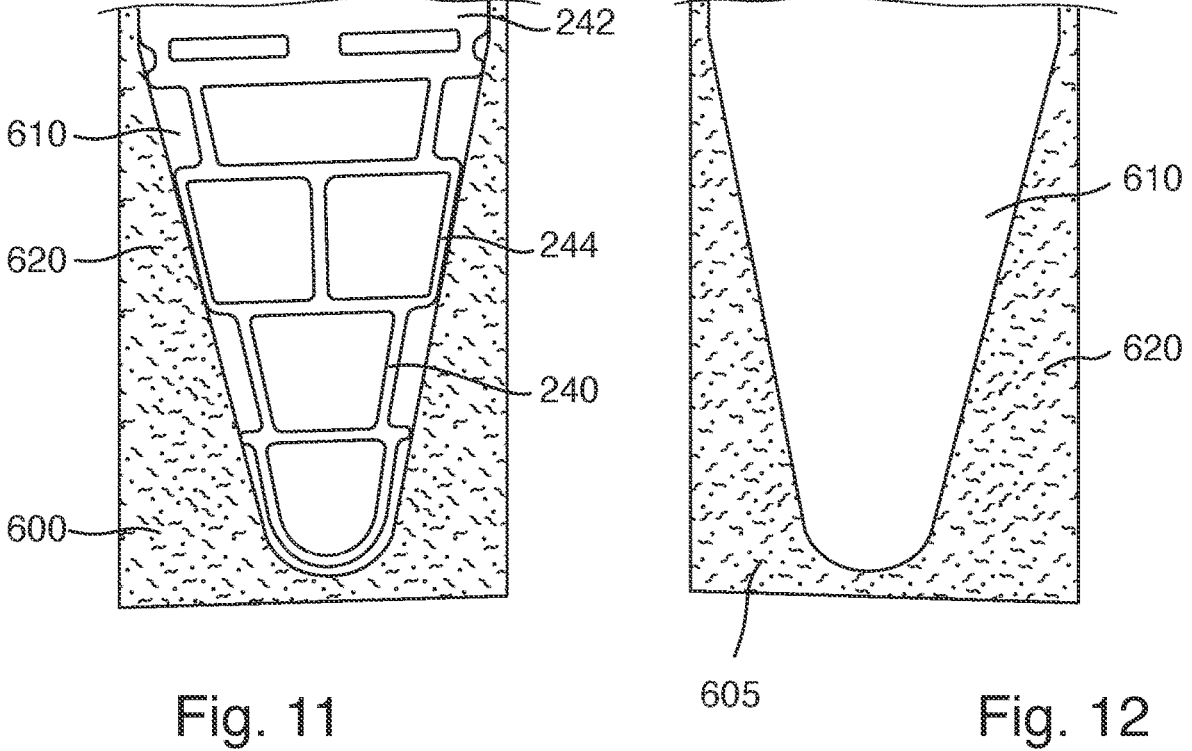
Fig. 11
Fig. 12

800     800     800     800 a)     b)     c)     d)

FM    F    $F_N$ $F_{S1}$    800

$F_{S2}$    F

210    $F_N$

220    $F_{S1}$

200    $F_{S2}$    100

10

SENSOR ARRANGEMENT FOR SENSING FORCES AND METHODS FOR FABRICATING A SENSOR ARRANGEMENT AND PARTS THEREOF

INTRODUCTION

The disclosure relates to a sensor arrangement for sensing forces, to a method for fabricating a top portion of a sensor arrangement, and to a method for fabricating a sensor arrangement.

When developing applications such as robots, sensing of forces applied on a robot hand or another part of a robot such as a leg or a manipulation device is crucial in giving robots increased capabilities to move around and/or manipulate objects. Known implementations for sensor arrangements that can be used in robotic applications in order to have feedback with regard to applied forces do not have sufficient resolution or are fragile.

SUMMARY

It is thus an object per at least some embodiments of the present disclosure to provide a sensor arrangement for sensing forces that is different or optimized with regard to the prior art. It is a further object per at least some embodiments to provide for corresponding methods for fabricating such a sensor arrangement or parts thereof.

The objects are achieved, per at least some embodiments, with the subject-matter of the main claims. Preferred embodiments can, for example, be derived from the dependent claims. The content of the claims is made a content of the description by explicit reference.

The disclosure relates to a sensor arrangement for sensing forces. The sensor arrangement comprises a base portion. It comprises a top portion comprising an elastically deformable wall, the top portion being mounted on the base portion such that the top portion and the base portion define an interior space. The wall comprises an outside measurement surface and an inside reflective surface, wherein the reflective surface partially delimits the interior space.

The sensor arrangement comprises a light source arrangement comprising several light sources being mounted on the base portion and arranged to emit light towards the reflective surface. The sensor arrangement comprises an image sensor comprising a detection surface viewing at least a part of the reflective surface.

With such a sensor arrangement forces applied on the measurement surface can be sensed by optical image recognition. Light reflected at the reflective surface yields a pattern on the image sensor that depends on forces applied on the measurement surface in a very sensitive way. Such a light pattern can thus be used to perform a very sensitive force inference.

Especially, the light sources may produce a structured light inside the interior space.

The base portion is typically a component that defines a base of the sensor arrangement. For example, it can be secured to some holding means, especially to a component of a robot. The top portion is typically a component that comes in contact with an object on which a force is applied or which applies forces on the sensor arrangement.

If an element is mounted to the base portion, that can also mean that it is mounted to another element of the base portion and/or that it is part of the base portion. This may for example apply to elements like light source arrangement, collimators, or image sensor. For example, an element mounted to the base portion can be mounted to a support structure, that may, for example, give stability and provide for connection possibilities to other elements.

The wall is typically a component that comes in contact with an external object and is deformed when the object applies a force on it, or vice versa. Possible implementations of the wall are described further below.

The interior space is typically completely surrounded and/or defined by the top portion and the base portion. The interior space can be a hollow interior. However, it can also be filled with a substance. Typically, light emitted from the light source arrangement propagates in the interior space towards the reflective surface, is reflected at the reflected surface, and propagates to the image sensor.

The term "sensor arrangement" is especially to be understood as an arrangement of components that have the functionality of a sensor, especially for sensing forces.

Especially, each light source may have a respective color. The light source arrangement may preferably, per at least some embodiments, comprise light sources having at least two or three different colors. This yields a light pattern on the detection surface having different colors and thus giving better evaluation possibilities as light can be identified as originating from one or at least only some of the light sources. However, also the same color can be used for the light sources.

The light sources and the detection surface are preferably, per at least some embodiments, arranged such that light emitted by the light sources and reflected by the reflective surface generates a light pattern on the detection surface. This light pattern can be used for evaluation purposes, especially using a neural network. The light pattern has been proven to be very sensitive to forces applied on the measurement surface. This relates even to direction of forces and shapes of indenters. It has thus been found that such a light pattern constitutes a powerful indication of applied forces.

Especially, a light pattern on the detection surface changes with deformation of the measurement surface. Such changes can be evaluated to infer forces or a force map.

Especially, a color distribution of light reflected from the reflective surface on the detection surface changes with deformation of the measurement surface. Such color distribution can especially change when different colors are used for the light sources. The color distribution change has been shown to be very sensitive to applied forces.

According to an implementation, the reflective surface is diffuse reflective. This may especially mean that light impacting on the reflective surface is not reflected like in the case of a mirror, but like an at least slightly rough surface. The light may be slightly attenuated with reflection at the diffuse reflective surface. In an alternative implementation, also a mirror-like reflective surface may be used.

Especially, the image sensor may be mounted on the base portion and/or in the interior space. This is an easy and reliable implementation, which provides for short distances to the reflective surface. However, the image sensor may also be mounted at other places.

One, some or all light sources may have an adjustable color. This can especially be used in order to set the color during a setup procedure. However, also fixed colors can be used.

One, some or all light sources may have an adjustable brightness. This can especially be used in order to set the brightness during a setup procedure. However, also fixed brightness can be used.

Preferably, per at least some embodiments, the light sources are arranged surrounding the image sensor. This may lead to a preferable distribution of light inside the interior space.

Preferably, per at least some embodiments, the light sources are arranged to emit light to yield a distribution of reflected light on the detection surface that does not yield an intensity beyond a saturation density. This prevents an oversaturation, which could lead to errors when inferring forces. For example, parameters to adjust for preventing oversaturation are brightness of light sources, position and size of collimators, camera exposure time and lenses. However, also other parameters can be used for that purpose.

According to an embodiment, the light sources are light emitting diodes. Such light emitting diodes are reliable light sources. However, also other types can be used.

Preferably, per at least some embodiments, the sensor arrangement comprises several collimators, each collimator being assigned to a light source and preferably defining a respective angle of radiation and/or a cone of emitted light. With such collimators, propagation of light rays towards the reflective surface can be controlled very exactly.

One, some or all collimators may be positioned acentric to the assigned light source. This gives suitable light distribution in many applications. However, also a centric positioning can be used.

The collimators may especially be embodied as holes in a collimator ring. This has been shown to be an easy realization of the collimators. The collimator ring may block light except from light passing through the holes.

The light sources and/or the collimators may especially be arranged to cover at least 80%, at least 85%, at least 90%, or 100% of the reflective surface, or of an intended measurement area, or of an area being inside to the measurement surface or an intended measurement surface, with light. Thus, a large part of such a surface or area can be used. The intended measurement area may especially be an area, i.e., a subpart of the measurement surface. The area inside to the measurement surface may be an area opposite to the measurement surface on the wall. The intended measurement surface may be a subpart of the measurement surface, wherein the measurement surface may be defined as a surface that is in principle able to be used for force inference.

The light sources and/or the collimators may be arranged so that at least 60%, at least 70%, at least 80%, at least 90%, or 100% of the reflective surface is only directly lid with light emitted from at most 4 light sources and/or with light emitted from at least 2 light sources. This has been proven to yield a light pattern on the detection surface that can be used for a considerably good force inference. A part directly lid is especially a part in which light rays propagate directly from a light source to the part, without being reflected from another part of the reflective surface.

According to an implementation, the collimators have a collimator hole diameter of at least 0.8 mm. According to an implementation, the collimators have a collimator hole diameter of at most 4 mm. Such diameters have been proven suitable for typical applications. However, also other diameters and even other shapes than a round hole can be used.

The light sources may be arranged in a circle on the base portion. Thus, the light sources may form or define a circle. This gives a predictable light pattern which is especially suitable for typical implementations in which the top portion has some circular symmetry.

The detection surface may be configured and arranged to see at least 70%, at least 80%, at least 90%, or the entire reflective surface. This may especially mean that the detection surface can detect light reflected from such part of the reflective surface. This gives high measurement accuracy.

Especially, the image sensor may be or comprise a color camera sensor and/or may be color sensitive. This gives enhances measurement capabilities compared to black/white or grayscale sensors, that can in principle also be used.

Especially, the image sensor may comprise a plurality of pixels, each pixel being configured to detect light individually. Thus, the pixels may define the resolution of the light detector.

The detection surface may face towards the reflective surface. Thus, light reflected at the reflective surface may directly propagate to the detection surface, eventually through some optical means like a wide-angle lens as described herein. However, also other implementations are possible.

The detection surface may be parallel to an interior surface of the base portion. This gives a simple implementation. However, also other orientations are possible.

The detection surface may be configured to detect light patterns and/or images. Such light patterns or images may be used for force inference, as described herein.

The image sensor may be configured to detect light patterns and/or images with a frame rate. Thus, frames are consecutively detected with typically fixed time intervals between them.

Especially, the frame rate may be at least 10 fps (frames per second), at least 20 fps, at least 30 fps, at least 50 fps, or at least 100 fps. Especially, the frame rate may be at most 30 fps, at most 50 fps, at most 100 fps, or at most 200 fps. Such values have been proven suitable for typical applications. Each lower value can be combined with a higher value to form a suitable interval. However, also other values can be used.

The image sensor may comprise a wide-angle lens, or a fisheye lens, being optically positioned between the reflective surface and the detection surface. This may improve image detection. For example, it may ensure that the image detector observes a specific part of the reflective surface.

Especially, the interior space may be a hollow space. This may mean that it is filled with air. However, it may also be filled with another substance, especially an optically transparent substance like a fluid, solid, glass or elastomer.

The light sources and/or the collimators may be configured to emit light in respective cones. Such cones may be defined by respective cone angles which delimit the outer dimensions of a cone. Cones of light may have a cross-sectional area that is constantly increasing with increasing distance from the light source. The collimators may also be used to define such shape after the light has passed the collimator.

Especially one, some or all cones may have a cone axis being inclined by more than 0° outwards relative to a common axis and/or relative to an axis normal to the base portion. This may lead to a prevention of an oversaturation at a tip of the top portion. Thus, measurement of forces in the vicinity of the tip may be improved. The base portion may especially extend along a plane, to which the axis may be normal, i.e., perpendicular.

Especially one, some or all cones may have a cone axis being inclined by at most 10° outwards relative to a common axis and/or relative to an axis normal to the base portion. This has been proven suitable for typical applications. However, also larger angles may be used.

Especially one, some or all cones may have an outer cone angle of at least 35° and/or of at most 80°. The outer cone angle may be an angle of the outer boundary of the cone, especially relative to the cone axis and/or a central propagation direction. The cone axis may define a center of the cone and/or a propagation direction of light.

Especially, the cones may partially overlap in planes perpendicular to a common axis, wherein the overlaps are depending on a distance between plane and base portion. This may omit parts of the reflective surface that are not lid and could thus not be used for force inference. Especially, the light sources and the image sensor may be arranged such that light emitted by the light sources and reflected by the reflective surface is detected by the image sensor.

According to an implementation, the reflective surface is covered by a pattern and/or several trackable objects. This may increase force inference accuracy. According to an alternative implementation, the reflective surface is a smooth surface.

According to an embodiment, the sensor arrangement comprises a common axis. Especially, the top portion may be fully circular around the common axis. This corresponds to a simple implementation. Alternatively, the top portion may be partly circular around the common axis. This may allow for specific structures, for example a thinned section as described herein.

The detection surface may especially be perpendicular to the common axis.

The light sources may be arranged to emit light parallel to the common axis. This may yield a geometrically simple implementation. This emission is especially a light emission prior to possible deflection or obstruction by collimators.

Especially, different portions of the reflective surface may be illuminated by the light sources with different colors from different directions. This gives increased force inference capabilities.

According to an implementation, the top portion may be tapered with an outer diameter declining with increasing distance from the base portion. This may yield an outer shape being suitable for typical use cases in which a tip is to be used for manipulation purposes or specific force measurement.

Especially, the top portion and/or the wall may be cone shaped.

Especially, the wall may be configured to relay deformations from the measurement surface to the reflective surface. This may especially mean that a force applied to the measurement surface induces a deformation of the measurement surface and this deformation is relayed through an inner part of the wall to the reflective surface, which also undergoes a deformation that leads to a different reflection of light at a specific point or area. This different reflection may lead to a different light pattern on the detection surface, which may be measured and evaluated.

Preferably, per at least some embodiments, the top portion is releasably mounted on the base portion. This allows for reuse of the base portion with a different top portion, for example if the top portion has been damaged or has lost its properties relevant for the measurement purpose. For example, the base portion may remain fixed at a part of a robot or another component, while the top portion may be exchanged when needed.

A releasable mount may especially mean that specific means are provided for releasing the top portion from the base portion without damaging of components.

Especially, the top portion may be mounted on the base portion in a way that makes the top portion exchangeable.

The top portion may be releasably mounted to the base portion by a bayonet mount and/or a screw connection and/or by pairs of tongues and corresponding notches. Such connections have been proven to give a simple exchangeability and a secure connection. However, also other connection types can be used.

According to an implementation, the top portion only comprises the wall. In that case the wall will typically provide sufficient stability itself. The wall may especially only comprise a homogeneous wall material, especially without a support structure made of another material.

According to an implementation, the top portion comprises a skeleton positioned inside the wall. Such a skeleton may give additional stiffness. It may be made of a different material compared with the wall. Especially, the skeleton may comprise a number of wires or wire-like elements.

Preferably, per at least some embodiments, the skeleton is grid shaped. This may mean that the skeleton is made of relatively thin wires or other elements that leave space between them. This space is typically filled with wall material. Furthermore, the skeleton is typically fully or partly surrounded by wall material.

The skeleton may preferably be made of steel, stainless steel, or aluminum. Such materials provide for sufficient stability. However, also other materials can be used. Especially, any other material that can withstand the desired maximal forces and/or can be manufactured in the required shape, for example by 3D printing, can be used.

For example, aluminum or stainless steel can be used for the skeleton. Other materials are also possible like copper, bronze, brass, or carbon fiber.

Especially, the skeleton is rigid or semi-rigid. This provides for sufficient stiffness.

Especially, the wall may comprise a wall material. This may be suitable for transferring deformations from the measurement surface to the reflective surface.

Preferably, per at least some embodiments, the wall material comprises an elastomer. For example, Smooth-On Ecoflex 00-30, Ecoflex 00-35, Ecoflex 00-50 etc. can be used. Especially a soft elastomer with high elongation rate can be used. For example, the elongation rate of the wall material may be at least 800% and/or at most 1,000%, or 900%.

Preferably, per at least some embodiments, the wall material comprises aluminum powder and/or aluminum flakes. This has shown to give a preferred reflectivity of the reflective surface. For example, the powder and/or flakes are present to create the right type of reflective surface. They may create changes in shading when being deformed and/or when an angle to a light source changes. Especially, aluminum powder may be used to isolate ambient light, and aluminum flakes may be used to increase reflectivity. Powder typically has a lower diameter than flakes.

The skeleton is preferably, per at least some embodiments, surrounded by the wall material. This gives increased stability to the wall material.

Especially, the skeleton may be completely overmolded by the wall material. Alternatively, the skeleton may be partly overmolded by the wall material.

The skeleton may especially be reusable. This may mean, for example, that a wall material surrounding a skeleton can be dissolved in some solvent, leaving the skeleton without surrounding wall material. Then, a new wall material can be overmolded.

Especially, the wall may have a thickness of at least 0.8 mm or at least 1.2 mm.

Especially, the wall may have a thickness of at most 4 mm or at most 5 mm.

While such values are suitable for typical applications, also other values can be used. The given values may especially relate to portions of the wall outside a thinned portion.

According to an implementation, the wall comprises a thinned section having a lower thickness than the rest of the wall. Such a thinned section may especially give a higher sensitivity at this local region.

The thinned section may especially be located opposite to the base portion. At such a location a high sensitivity may be preferable.

The thinned section may be shaped according to a fingernail. For example, the sensor arrangement may be shaped like a thumb or another finger. The thinned section may be placed at a position of a fingernail at the finger. The thinned section may be totally or at least substantially flat or only lightly bent. In general, it may have any shape.

Especially, the thinned section may comprise less than one fourth of the measurement surface. Thus, stability is not compromised, while giving a suitable increased measurement capability.

Preferably, per at least some embodiments, the thinned section has a thickness of at most 0.8 mm or at most 1.2 mm and/or has a thickness of at most 30% or at most 50% of the thickness of the wall outside the thinned section. This gives a suitable increased measurements sensitivity. However, also other values can be used. The wall may have a uniform thickness outside the thinned section. However, if the wall does not have a uniform thickness, the reference for defining a relative thickness of the thinned section may be a mean value.

The sensor arrangement may be a fingertip and/or a manipulation element of a robot. Thus, the sensor arrangement can have two functionalities, namely manipulation of an element and measuring of applied forces. However, also other implementations are possible.

The disclosure further relates to a method for fabricating a top portion for a sensor arrangement, the method comprising the following steps:

providing a skeleton made of a skeleton material, the skeleton surrounding an interior space, and covering the skeleton with a wall material such that the wall material forms an elastically deformable wall defining an outside measurement surface and an inside reflective surface, wherein the reflective surface delimits the interior space.

This provides for a simple and reliable manufacturing of a top portion. Regarding details of the elements, references is made to the description given elsewhere herein. All statements given with respect to method aspects can in principle be applied for structural aspects, and vice versa.

Especially, the skeleton material may be stronger than the wall material. Thus, the skeleton provides for stability. The skeleton may be made more rigid than the wall material.

Providing the skeleton may comprise 3D printing of the skeleton. In other words, the skeleton may be 3D printed. This provides for increased flexibility regarding design of the skeleton. However, also other processes can be used.

The skeleton may be made of a plurality of wires between which openings are formed. Such openings may be filled with wall material.

Preferably, per at least some embodiments, the skeleton may be dome shaped or cone shaped.

Covering may especially be made by overmolding. This is a reliable method for placing materials like elastomers around the skeleton. However, also other methods can be used.

The interior space may be hollow inside the top portion. However, it may also be filled, for example with an optically transparent material.

The method may further comprise a step of covering the reflective surface with a pattern and/or several trackable objects. Alternatively, the reflective surface may be left smooth.

Especially, a structured cast may be applied in order to produce the pattern. Such a structured cast may be the counterpart to the pattern.

The skeleton may comprise a common axis. The skeleton may be partly or fully circular around the common axis.

The skeleton may be tapered with an outer diameter declining towards a tip. This may correspond to a preferred shape of the top portion.

The wall material may be configured to relay deformations from the measurement surface to the reflective surface.

The skeleton may be grid shaped.

The skeleton may be made of steel, stainless steel, or aluminum. With regard to further alternatives, reference is made to the statements given elsewhere herein.

The skeleton may be rigid or semi-rigid.

The wall material may comprise an elastomer.

The wall material may comprise aluminum powder and/or aluminum flakes.

The skeleton may be covered with the wall material such that the wall material surrounds the skeleton.

The wall material may be formed to have a thickness of at least 0.8 mm or at least 1.2 mm, and/or the wall material may be formed to have a thickness of at most 4 mm or at most 5 mm.

The wall material may be formed to comprise a thinned section having a lower thickness than the rest of the wall material. This may especially be used for light-touch detection and shape discrimination.

The thinned section may be located nearby a tip of the skeleton.

The thinned section may be shaped according to a fingernail.

The thinned section may comprise less than one fourth of the measurement surface.

The thinned section may have a thickness of at most 0.8 mm or at most 1.2 mm and/or may have a thickness of at most 30% or at most 50% of the thickness of the wall outside the thinned section.

The skeleton may be covered such that the wall material is detachable from the skeleton.

The disclosure relates further to a method for fabricating a sensor arrangement, the method comprising the following steps:

providing a base portion, fabricating a top portion having an interior space, mounting a light source arrangement comprising several light sources on the base portion, mounting an image sensor on the base portion, and covering the base portion with the top portion such that light sources are arranged to emit light towards the interior space and that the image sensor is positioned in the interior space.

This method provides for a reliable fabrication of a sensor arrangement.

Especially, the top portion may be fabricated as disclosed herein. All implementations and variations can be applied.

The light sources may be mounted such that they surround the image sensor.

The method may further comprise a step of arranging several collimators over the light sources defining respective angles of radiation and/or cones of emitted light. For example, such collimators may be formed in a collimator ring, so that in fact the collimator ring is arranged.

The fabricated sensor arrangement may especially be embodied as described herein. All embodiments and variations can be applied.

The disclosure relates further to a sensor arrangement as disclosed herein or manufactured as disclosed herein, further comprising an electronic control module configured to perform a method for force inference of the sensor arrangement.

Thus, the sensor arrangement may have its own control module. For example, the control module can be an electronic entity located inside or near the rest of the base portion. Alternatively, a control module may also be positioned distant from base portion and top portion, for example it may be a computer.

The control module may be configured to perform the method for force inference to provide a force map of the measurement surface, the force map comprising a plurality of force vectors. Regarding the method for force inference, reference is made to the description given elsewhere herein. All embodiments and variations can be applied.

Especially, the force map may comprise at least 0.25 force vectors per mm2, at least 0.5 force vectors per mm2, at least 0.75 force vectors per mm2, at least 1 force vector per mm2, at least 1.5 force vectors per mm2, or at least 2 force vectors per mm2, and/or the force map may comprise at most 0.25 force vectors per mm2, at most 0.5 force vectors per mm2, at most 0.75 force vectors per mm2, at most 1 force vector per mm2, at most 1.5 force vectors per mm2, or at most 2 force vectors per mm2. Also other values can be used.

Especially, each force vector may comprise a normal force component, a first shear force component and a second shear force component.

Especially, the first shear force component may correspond to a first shear force and the second shear force component may correspond to a second shear force. The first shear force may be perpendicular to the second shear force.

Especially, the sensor arrangement disclosed herein may be finger shaped. It may be a soft sensor and/or may have all-around force sensation capabilities. The sensing capabilities may be enabled by machine learning. The sensor arrangement is accurate, sensitive, durable, and affordable.

There are two main techniques to obtain 3D information from a single camera that can preferably be used with the disclosed sensor arrangement: Photometric stereo (PS) uses multiple images of the same scene with varying disparate light sources to infer the 3D shape from shading information. Structured light (SL) is a single-shot 3D surface reconstruction technique that uses a unique light pattern and the fact that it gets differently projected on the 3D surface.

Generally, SL is typically used in global reconstruction, while PS has its strength in capturing local details. Insight combines PS and SL for the deformation reconstruction of a full 3D dome-shaped surface in the single-camera single-image setting. There are several light sources next to the camera or image detector, which produce light cones. When an area of the measurement surface gets contacted and deforms, the contacted area will move, and the visible color will change due to two effects: a difference in color through shading and movement between color zones with different intensity of the light due to the light cones.

The top portion and/or the base portion may especially be designed to prevent ambient light from entering the interior space. This prevents distortions of the measurements by such ambient light.

In the following, further inventive aspects are described. Such aspects may be combined, alone or in combination, with other features disclosed herein. They can also be regarded as separate inventive aspects and can be made the subject of claims.

The disclosure relates to a method for force inference of a sensor arrangement for sensing forces.

The sensor arrangement, e.g., the sensor arrangement for which the method may be applied, may especially comprise at least
- an elastically deformable wall, the wall comprising an outside measurement surface and an inside reflective surface, wherein the reflective surface partially delimits an interior space,
- a light source arrangement comprising several light sources being arranged to emit light towards the interior space, and
- an image sensor being mounted in the interior space.

With regard to the sensor arrangement, reference is made to the description given elsewhere herein. All disclosed embodiments and variations may be applied.

The method for force inference comprises the following steps:
- reading out image data from the image sensor, and
- calculating a force map on the measurement surface based on the image data, preferably using a feed-forward neural network, the force map comprising a plurality of force vectors.

Such a method provides for a very accurate force inference that is based on image detection. The usage of a feed-forward neural network omits the necessity for implementing analytical force evaluation. The neural network may especially be trained as disclosed herein. It has been found that the training leads to a very accurate and fine force inference that is even able to detect multiple indenters and to identify positions, direction of forces and shapes of indenters.

The force map may especially be a map that is defined on the real measurement surface, wherein the force map may comprise several map points. At each map point, some information may be defined, for example a force vector as described further below. The force map typically gives information about forces that are applied on the measurement surface. For example, such forces may originate from an indenter or several indenters pressing on the measurement surface or from an object that is currently manipulated by the sensor arrangement, e.g., when the sensor arrangement is a robotic finger tip.

The feed-forward neural network may especially be an artificial neural network. It gets the image data as input and delivers a force map as output. In principle, a feed-forward neural network is an artificial neural network wherein connections between the nodes do not form a cycle.

In the following, training aspects of the network will be described. The steps for training mentioned in this section are especially to be considered as steps that have been performed before force inference of real force measurements is performed. Thus, the method for force inference can be considered as a combination of training steps performed before the force inference, and the force inference using a trained network. The method for force inference can also be considered as the force inference itself, using a network that has been trained accordingly. Further below, a separate training method is described. This training method can be performed independently from any force inference. The force inference in which typically an image sensor is read out and a force map is generated is to be considered as the action to be performed in a use case, i.e., when the sensor arrangement is to be used for measuring or evaluating forces applied on the measurement surface, for example because the sensor arrangement is currently manipulating an object or is otherwise in contact with an object applying pressure on the measurement surface.

According to an implementation, the feed-forward neural network was trained with the following steps performed before the force inference:

performing a plurality of force tests on the sensor arrangement, each force test comprising application of a force by one indenter on a position on the measurement surface of the sensor arrangement, simultaneously measuring a force applied by the indenter and simultaneously reading out image data from the image sensor, for each force test, performing a corresponding simulation with a model of the sensor arrangement, each simulation comprising application of a simulated force on a simulated measurement surface of the model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and training the feed-forward neural network with the image data and the corresponding calculated simulated force maps.

Such training steps can provide for a suitable training of the feed-forward neural network. The feed-forward neural network can learn the real forces and the corresponding force maps, the former coming from measurements and the latter coming from simulations.

The measurement of a force and the readout of the image data is typically performed while the force is actually applied, preferably in a stationary state. The force is then used in a simulation.

It is to be noted that all terms denoted with "simulated" typically relate to the simulation. For example, the simulated measurement surface is a measurement surface that only exists in simulation. The model is able to calculate a force map out of the applied simulated force in a deterministic manner. For example, a simple spatial distribution around the force point using Hertz Contact Theory can be used. As an alternative example, a finite element model can be used.

The simulated force may be identical to the measured force. This may mean that the simulated force can have the same components in three dimensions, and/or that it has the same orientation and absolute value. However, the simulated force may also correspond to the measured force by a predefined relationship.

Preferably, per at least some embodiments, the force tests for training the feed-forward neural network are performed with a plurality of indenters each having a respective indenter shape. Especially, the indenter shapes may be different. Thus, the feed-forward neural network may be trained in a way that it can differentiate different indenter shapes, i.e., that it produces different force maps when different indenters are applied.

For example, the indenter shapes may be selected out of a group comprising at least of tip, round, triangular cross section, square cross section, hemi-sphere, cube, and cylinder. All mentioned indenter shapes may be used in a training process, or only a subset may be used. Also, other indenter shapes can be used.

Preferably, per at least some embodiments, the simulations are performed with simulated forces applied by or based on simulated indenters. Such simulated indenters may have respective simulated indenter shapes corresponding to real indenter shapes used in the corresponding force test. Thus, the simulated force applied on the simulated measurement surface can more closely correspond to the real force, as also an indenter shape is resembled. This improves training of the feed-forward neural network.

Preferably, per at least some embodiments, the feed-forward neural network was trained using a plurality of different indenter shapes. This can train the feed-forward neural network to better differentiate different indenter shapes.

Preferably, per at least some embodiments, the feed-forward neural network was trained using a plurality of indenters with different sizes. This allows training of the feed-forward neural network to differentiate different indenter sizes.

Preferably, per at least some embodiments, the feed-forward neural network was trained with the indenters, at least for a part of the force tests for training the feed-forward neural network, being applied with respective shear forces. This allows to train the feed-forward neural network such that it can differentiate shear force. For example, the force map may also comprise simulated shear forces. Especially, different shear forces may lead to different force maps.

Preferably, per at least some embodiments, the measured forces each comprise a normal force component, a first shear force component and a second shear force component. This defines strength and orientation of a force in a coordinate system. Especially, a global coordinate system may be used. However, also other representations of forces can be used.

Preferably, per at least some embodiments, of the measured forces, the first shear force component corresponds to a first shear force and the second shear force component corresponds to a second shear force. Especially, the first shear force is perpendicular to the second shear force.

Each of the measured forces may comprise three components in a reference coordinate system. The reference coordinate system may be a global coordinate system. Any different representation that only requires some standard mathematical transformation is to be regarded as equivalent.

Preferably, per at least some embodiments, the feed-forward neural network was trained using a plurality of forces having different shear force components. This may specifically train the feed-forward neural network to differentiate different shear forces. Especially, different shear forces in real applied forces may lead to different force maps.

Preferably, per at least some embodiments, the feed-forward neural network was trained using a plurality of forces having different normal force components. This allows training the feed-forward neural network to differentiate different normal forces. A normal force component may be a component of a force being locally perpendicular to a surface.

The forces may be measured using a force sensor in the indenter or positioned adjacent to the indenter. This allows direct force measurement. Especially, the force sensor may not only measure the absolute value of the forces, but also corresponding orientations. With the orientation, shear forces can be derived.

Preferably, per at least some embodiments, each of the simulated force vectors comprises a normal force component, a first shear force component, and a second shear force component. Thus, the simulated force vectors may resemble shear force components on the simulated force map that can be used for training the feed-forward neural network.

Preferably, per at least some embodiments, of the simulated force vectors, the first shear force component corresponds to a first shear force and the second shear force component corresponds to a second shear force. Especially, the first shear force is perpendicular to the second shear force.

Preferably, per at least some embodiments, each of the simulated force vectors comprises three components in a reference coordinate system. The reference coordinate system may be used for all force representations in the method. However, also other representations can be used.

Preferably, per at least some embodiments, image data on which a calculated force map is based comprises, in addition to image data read out from the image sensor, several invariant images, preferably three invariant images. The image data read out from the image sensor may be denoted as a variable image. The invariant images may be set as described below. This has been shown to improve results from the feed-forward neural network. The invariant images can be used without variation in all training steps and force inference steps.

Preferably, per at least some embodiments, the invariant images are a greyscale gradient image, an image of a skeleton, and/or a reference light pattern. Such images have been proven suitable for typical force inference applications.

Preferably, per at least some embodiments, the variable image as part of the image data was taken just before calculating the force map. Thus, the force map corresponds to an actual state of the sensor arrangement.

According to at least some implementations, the force map comprises at least 0.25 force vectors per mm2, at least 0.5 force vectors per mm2, at least 0.75 force vectors per mm2, at least 1 force vector per mm2, at least 1.5 force vectors per mm2, or at least 2 force vectors per mm2. According to preferred implementations, the force map comprises at most 0.25 force vectors per mm2, at most 0.5 force vectors per mm2, at most 0.75 force vectors per mm2, at most 1 force vector per mm2, at most 1.5 force vectors per mm2, or at most 2 force vectors per mm2. Each lower value can be combined with a higher value to form a suitable interval. However, also other values can be used.

Preferably, per at least some embodiments, each force vector comprises a normal force component, a first shear force component, and a second shear force component. Thus, the force vector may give not only normal components, but also shear force components.

Preferably, per at least some embodiments, the first shear force component corresponds to a first shear force and the second shear force component corresponds to a second shear force. The first shear force may especially be perpendicular to the second shear force.

Preferably, per at least some embodiments, each force vector comprises three components in a reference coordinate system. This can also give an orientation of the force and can thus give shear forces. It is to be noted that a force vector being not normal to a local surface typically comprises shear forces.

Preferably, per at least some embodiments, the feed-forward neural network was trained with, or the calculation of the force map is performed with, an additional image of the reflective surface of the sensor arrangement without external impact as part of the image data. This may increase detection accuracy.

Preferably, per at least some embodiments, the feed-forward neural network was trained with, or the calculation of the force map is performed with, an image of a skeleton of a wall of the sensor arrangement as part of the image data. This may also increase detection accuracy.

Preferably, per at least some embodiments, the feed-forward neural network was trained with, or the calculation of the force map is performed with, a greyscale gradient image for position encoding as part of the image data. This may also increase detection accuracy.

Such additional images, e.g., images of the reflective surface without external impact, of the skeleton, and a greyscale gradient image, may increase detection accuracy and/or provide for a better training. These images may be invariant images and may be used as part of the image data in addition to a variable image that may be read out from the image sensor. An image of the reflective surface without external impact may especially be an image of the reflective surface taken when no force was applied on the measurement surface.

In the following, a separate method for training of a feed-forward neural network will be described. This method is not part of a method for force inference, but is performed separately for training the network. With regard to the respective features, reference is made to the statements already given above with respect to training of the network and the method for force inference, in order to avoid repetition.

The disclosure relates to a method for training a feed-forward neural network, wherein the feed-forward neural network preferably calculates a force map on a measurement surface of a sensor arrangement based on image data of an image sensor, the force map comprising a plurality of force vectors, wherein the feed-forward neural network is trained with the following steps:

performing a plurality of force tests on the sensor arrangement, each force test comprising application of a force by one indenter on a position on the measurement surface of the sensor arrangement, simultaneously measuring a force applied by the indenter and simultaneously reading out image data from the image sensor, for each force test, performing a corresponding simulation with a model of the sensor arrangement, each simulation comprising application of a simulated force on a simulated measurement surface of the model, thereby calculating a simulated force map on the simulated measurement surface, the simulated force map comprising a plurality of simulated force vectors, the simulated force corresponding to the measured force and being applied on a position on the simulated measurement surface corresponding to the position on the measurement surface, and training the feed-forward neural network with the image data and the corresponding calculated simulated force maps.

According to an implementation, force tests for training the feed-forward neural network are performed with a plurality of indenters each having a respective indenter shape.

According to an implementation, the indenter shapes are selected out of a group comprising at least tip, round, triangular cross section, square cross section, hemi-sphere, cube, and cylinder.

According to an implementation, the simulations are performed with simulated forces applied by or based on simulated indenters, preferably with respective simulated indenter shapes corresponding to real indenter shapes used in the corresponding force test.

According to an implementation, the feed-forward neural network is trained using a plurality of different indenter shapes.

According to an implementation, the feed-forward neural network is trained using a plurality of indenters with different sizes.

According to an implementation, the feed-forward neural network is trained with the indenters, at least for a part of the force tests for training the feed-forward neural network, being applied with respective shear forces.

According to an implementation, the measured forces each comprise a normal force component, a first shear force component and a second shear force component.

According to an implementation, of the measured forces, the first shear force component corresponds to a first shear force and the second shear force component corresponds to a second shear force. The first shear force may especially be perpendicular to the second shear force.

According to an implementation, each of the measured forces comprises three components in a reference coordinate system.

According to an implementation, the feed-forward neural network is trained using a plurality of forces having different shear force components.

According to an implementation, the feed-forward neural network is trained using a plurality of forces having different normal force components.

According to an implementation, the forces are measured using a force sensor in the indenter or positioned adjacent to the indenter.

According to an implementation, each of the simulated force vectors comprises a normal force component, a first shear force component and a second shear force component.

According to an implementation, of the simulated force vectors, the first shear force component corresponds to a first shear force and the second shear force component corresponds to a second shear force. The first shear force may especially be perpendicular to the second shear force.

According to an implementation, each of the simulated force vectors comprises three components in a reference coordinate system.

According to an implementation, the feed-forward neural network is used in a method for force inference as described herein. With regard to the method for force inference, all implementations and variations can be applied.

According to respective implementations, the force map comprises at least 0.25 force vectors per mm2, at least 0.5 force vectors per mm2, at least 0.75 force vectors per mm2, at least 1 force vector per mm2, at least 1.5 force vectors per mm2, or at least 2 force vectors per mm2.

According to respective implementations, the force map comprises at most 0.25 force vectors per mm2, at most 0.5 force vectors per mm2, at most 0.75 force vectors per mm2, at most 1 force vector per mm2, at most 1.5 force vectors per mm2, or at most 2 force vectors per mm2.

According to an implementation, each force vector comprises a normal force component, a first shear force component and a second shear force component.

According to an implementation, the first shear force component corresponds to a first shear force and the second shear force component corresponds to a second shear force. The first shear force may especially be perpendicular to the second shear force.

According to an implementation, each force vector comprises three components in a reference coordinate system.

According to an implementation, the feed-forward neural network is trained with an additional image of the reflective surface of the sensor arrangement without external impact in addition to the image data.

According to an implementation, the feed-forward neural network is trained with an image of a skeleton of a wall of the sensor arrangement as part of the image data.

According to an implementation, the feed-forward neural network is trained with a greyscale gradient image for position encoding as part of the image data.

According to an implementation, the feed-forward neural network is trained with one or more of a greyscale gradient image, an image of a skeleton, and/or a reference light pattern.

According to an implementation, the sensor arrangement is a sensor arrangement for sensing forces. The sensor arrangement may especially comprise one or more of the following: an elastically deformable wall, the wall comprising an outside measurement surface and an inside reflective surface, wherein the reflective surface partially delimits an interior space, a light source arrangement comprising several light sources and arranged to emit light towards the interior space, and an image sensor being mounted in the interior space.

Further reference is made to the description of a sensor arrangement given elsewhere herein. All described embodiments and variations can be applied.

According to an implementation, the sensor arrangement is a sensor arrangement for sensing forces. The sensor arrangement may especially comprise one or more of the following:

a base portion, a top portion comprising an elastically deformable wall, the top portion being mounted on the base portion such that the top portion and the base portion define an interior space, the wall comprising an outside measurement surface and an inside reflective surface, wherein the reflective surface partially delimits the interior space, a light source arrangement comprising several light sources being mounted on the base portion and arranged to emit light towards the interior space, and an image sensor being mounted on the base portion in the interior space.

With regard to further possible aspects of the sensor arrangement, reference is made to the statements given elsewhere herein. All embodiments and variations can be applied.

The sensor arrangement may especially be a robotic finger tip and/or a manipulation element of a robot. This allows integration of the functionality in a robot. However, also other implementations and applications are possible.

The disclosure relates further to a force inference module for force inference of a sensor arrangement for sensing forces, the force inference module being configured to perform a method for force inference as described herein. With regard to the method, all implementations and variations can be applied.

The force inference module may, for example, be implemented as a microcontroller, microprocessor, field programmable gate array, application specific integrated circuit, or as a computer. Especially, it may comprise processing means and memory means, wherein in the memory means program code is stored that makes the processing means to perform a method as disclosed herein.

The disclosure relates further to a sensor arrangement for sensing forces, the sensor arrangement comprising one or more of the following:

a base portion, a top portion comprising an elastically deformable wall, the top portion being mounted on the base portion such that the top portion and the base portion define an interior space, the wall comprising an outside measurement surface and an inside reflective surface, wherein the reflective surface partially delimits the interior space, a light source arrangement comprising several light sources being mounted on the base portion and arranged to emit light towards the interior space, an image sensor being mounted on the base portion in the interior space, and a force inference module as described herein.

With regard to the force inference module, all embodiments and variations as described herein can be applied.

The disclosure relates further to a computer program product for performing a method as disclosed herein. The disclosure relates further to a program code for performing a method as disclosed herein. The disclosure relates further to a non-volatile computer-readable storage medium on which program code is stored, wherein the program code, when executed by a processor, causes the processor to perform a method as disclosed herein. With regard to the method, all embodiments and variations as disclosed herein can be applied.

BRIEF DESCRIPTION OF THE FIGURES

Further advantages and variations will be apparent from the following description of embodiments, that will be given with respect to the accompanying drawing. In detail, FIG. 3 shows a top portion, FIG. 4 shows a skeleton, FIG. 5 shows another top portion, FIG. 10 shows light sources with collimators, FIG. 11 shows a mold with a skeleton, FIG. 12 shows a further mold.

DETAILED DESCRIPTION

Figure 1:
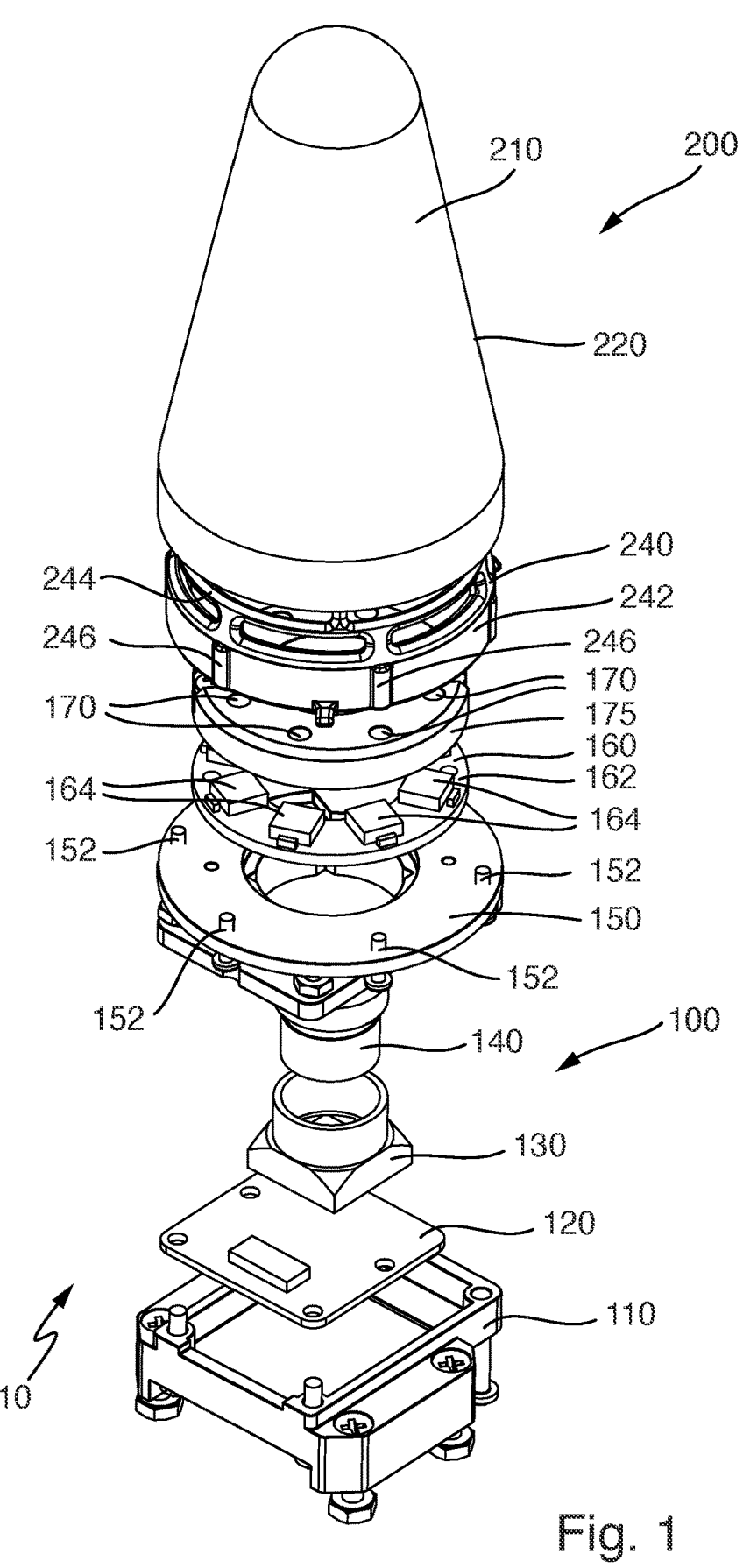
FIG. 1 shows an explosion view of a sensor arrangement.

FIG. 1 shows a sensor arrangement 10 for sensing forces. The sensor arrangement 10 comprises a base portion 100 and a top portion 200.

The base portion 100 comprises a support structure 110. This support structure 110 can especially be used in order to mount the sensor arrangement 10 to another entity, for example to a robot. The base portion 100 further comprises a printed circuit board 120, on which electronic components for controlling the sensor arrangement 10 are mounted.

The base portion 100 further comprises an image sensor 130 being positioned immediately above the printed circuit board 120. The image sensor 130 is embodied as a color camera being able to detect light and to produce image data in response thereto, wherein typically image data produced by the image sensor 130 will be further processed by electronic components being located on the printed circuit board 120.

The base portion 100 further comprises a wide-angle lens 140 being positioned immediately above the image sensor 130. The wide-angle lens 140 is position such that all light impinging on the image sensor 130 passes through the wide-angle lens 140. Thus, the wide-angle lens 140 is able to define a field of view of the image sensor 130. The wide-angle lens 140 can also be regarded as a part of the image sensor 130.

The base portion 100 further comprises a mounting structure 150. The mounting structure 150 is mounted directly to the support structure 110 using a plurality of screws 152 which are used to secure the top portion 200 to the base portion 100 in a way that the top portion 200 is releasable from the base portion 100. It will be shown further below how the connection of the top portion 200 and the base portion 100 is made.

The base portion 100 further comprises a light source arrangement 160. The light source arrangement 160 comprises a support ring 162 that is mounted on the mounting structure 150. The light source arrangement 160 comprises a plurality of light sources 164. These light sources 164 are embodied as light emitting diodes in the present embodiment. The light sources 164 are arranged to emit light to an interior space of the top portion 200 that will be further explained below with regard to FIG. 2.

The light sources 164 have different colors. For example, there may be red, blue, and green colors. It will be described further below how light emitted from light sources can be used in order to detect a force applied on the sensor arrangement 10.

Immediately above the light source arrangement 160 there is a collimator ring 175. The collimator ring 175 comprises a plurality of collimators 170 which are embodied as holes protruding vertically through the collimator ring 175. Each collimator 170 is positioned just above one light source 164. Thus, only light that went through a collimator 170 is able to reach the interior space inside the top portion 200. The collimators 170 may thus define light cones in the interior space, especially with respective cone axes and outer cone angles.

The top portion 200 comprises an elastically deformable wall 210. The elastically deformable wall 210 presents a measurement surface 220 to the outside of the sensor arrangement 10. The measurement surface 220 is a surface on which a force can be applied, wherein that force should be measured, for example by providing a force map that depends on the actually applied force. The actual inference of a force will be described further below.

The top portion 200 comprises a skeleton 240. The skeleton 240 is surrounded by the wall 210. In FIG. 1, the skeleton 240 and the wall 210 are shown separately from each other.

The skeleton 240 comprises a bottom ring 242 and a grid 244 being positioned above the bottom ring 242. The detailed structure of the skeleton 240 will be described further below. The bottom ring 242 comprises a plurality of protrusions 246 being arranged radially outwards and oriented perpendicular to the base portion 100. Such protrusions 246 comprise respective threaded holes for screws 152 that extend vertically. Through these threaded holes, respective screws 152 can be applied from below, wherein the screws 152 are secured in respective holes in the mounting structure 150 of the base portion 100. This allows a releasable mount of the top portion 200 on the base portion 100.

Figure 2:
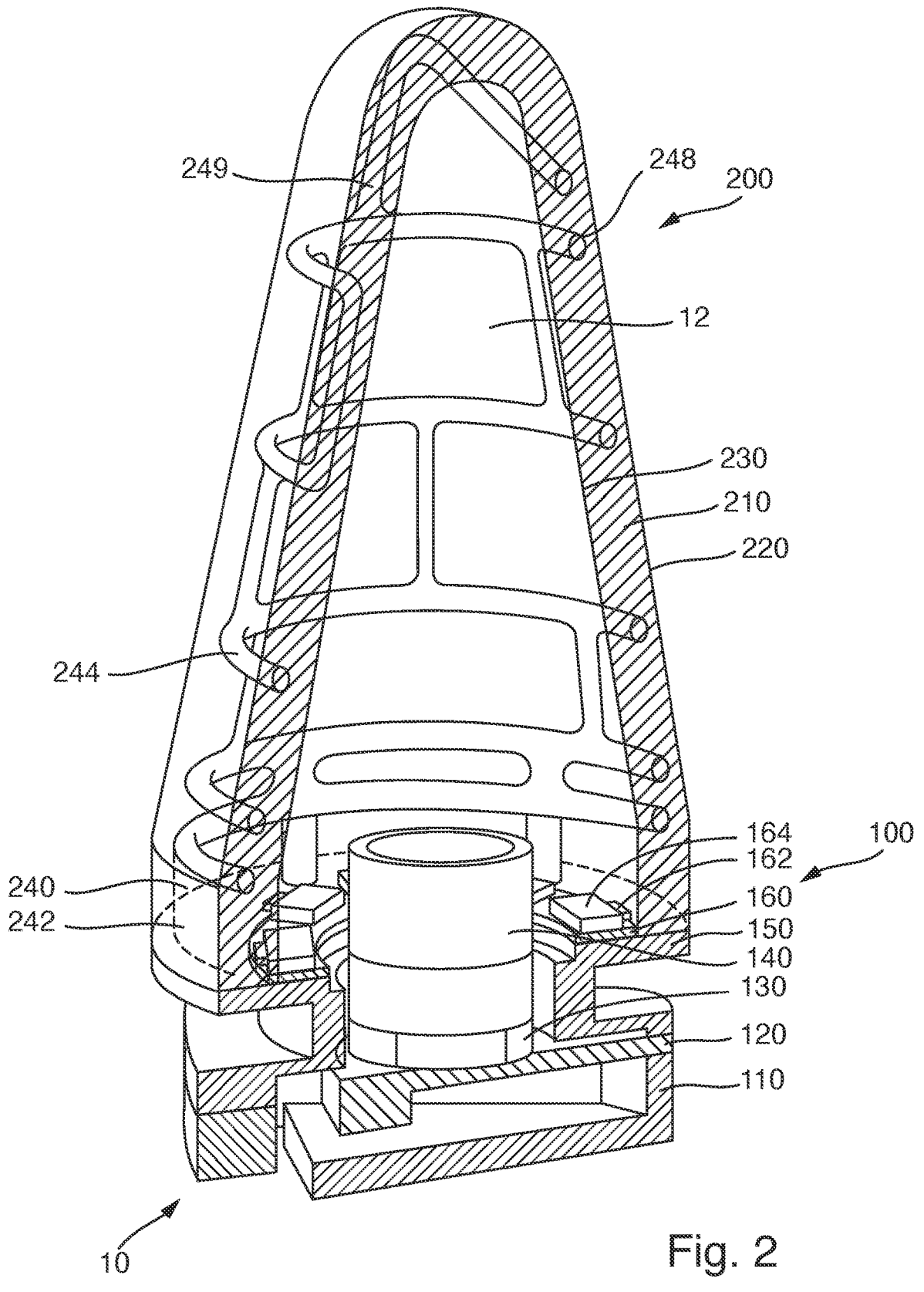
FIG. 2 shows a cross sectional view of a sensor arrangement.

FIG. 2 shows a cross sectional view of the sensor arrangement 10 in a mounted state. The skeleton 240 is visible inside the wall 210 despite being surrounded by the wall 210. This is for illustration purposes only. In practice, the skeleton 240 being surrounded by the wall 210 will not or at least not clearly be visible.

FIG. 2 shows a state in which all components of the sensor arrangement 10 are in their final position. As an exception, the collimator ring 175 is not shown in FIG. 2 for the purpose of having a better view on the light source arrangement 160.

As shown in FIG. 2, the top portion 200 and the base portion 100 define an interior space 12. The interior space 12 is surrounded by the wall 210. The wall 210 defines an inside reflective surface 230 that surrounds the interior space 12.

As shown in FIG. 2, the light sources 164 are arranged in the base portion 100 such that they emit light towards the interior space 12.

Light emitted from the light sources 164 will first pass through the collimators 170, that are not shown in FIG. 2. The collimators 170 define further propagation of the light, especially respective propagation directions and outer cone angles of light cones. The light then travels through the interior space 12 and reaches the reflective surface 230. The reflective surface 230 is diffuse reflective, so that incoming light is reflected in all directions with specific angle-dependent intensity, so the reflection is not like in a mirror.

As is shown in FIG. 2, the reflective surface 230 is only separated by the wall 210 from the measurement surface 220. The wall 210 is formed of an elastic material that relays deformations from the measurement surface 220 to the reflective surface 230. This means that any force applied on the measurement surface 220 not only deforms the wall 210 at the outside measurement surface 220, but also at the inside reflective surface 230. Such a deformation of the reflective surface 230 locally distorts reflection of light beams. Thus, measurement of the light beams inside the sensor arrangement 10 can be used in order to infer forces that have been applied on the measurement surface 220.

The image sensor 130 is also positioned inside the sensor arrangement 10. It is surrounded by the light sources 164 such that light emitted from the light sources 164 and reflected from the reflective surface 230 propagates to the image sensor 130. On a detection surface of the image sensor 130, the light produces a light pattern that is indicative for an applied force. It has even been found that such a light pattern is also indicative for a position and an amplitude and a direction of a force, and even for the shape and size of an applied indenter. Even a plurality of forces can be evaluated.

The grid 244 comprises a main part 248 and a fingernail section 249. The fingernail section 249 may hold a thin portion, that will be described further below. The main part 248 gives increased stability to the wall 210 such that it can withstand greater forces and does not deform substantially under the influence of external forces and gravitation. However, the ability to slightly deform and relay deformations from the measurement surface 220 to the reflective surface 230 remains active despite the skeleton 240.

FIG. 3 shows the wall 210 separately. The wall 210 has a cone shape as shown. At the tip, it has a round shape. It should be noted that this shape is a typical shape that has been proven suitable for a plurality of applications. However, it is not the only possible shape. Rather, all suitable shapes can be used. The measurement surface 220 defines the outside of the wall 210. Forces can be applied on the measurement surface 220 so that the wall 210 is deformed.

FIG. 4 shows the skeleton 240 separately. With regard to the already described components, reference is made to the description of FIG. 1. Especially, it can be seen that the grid 244 is formed out of a plurality of wires with relatively large spaces between them. These spaces will be filled by the material of the wall 210 so that the wall 210 surrounds the skeleton 240. Thus, the skeleton 240 gives a suitable stability to the wall 210.

FIG. 5 shows a wall 210 according to a second embodiment. In contrast to the embodiment shown in FIG. 3, the wall 210 shown in FIG. 5 has a thinned section 250. The thinned section 250 has a smaller thickness compared with the other part of the wall 210. It is surrounded by an edge 255.

When FIGS. 4 and 5 are viewed together, it is evident that the fingernail section 249 of the skeleton 240 supports the thinned section 250 of the wall 210. The support is present approximately along the edge 255. This measure gives increased stability to the thinned section 250. However, it should be noted that the same design of a skeleton can also be used for a top portion 200 not having a thinned section 250.

The thinned section 250 especially leads to a locally increased sensitivity with regard to force detection. For example, a force applied on the thinned section 250 leads to a greater deformation of the wall 210 and thus also to a larger deformation of the reflective surface 230. Thus, a force applied on the thinned section 250 also leads to a greater change in a light pattern detected by the image sensor 130.

Figures 6, 7, 8, 9:
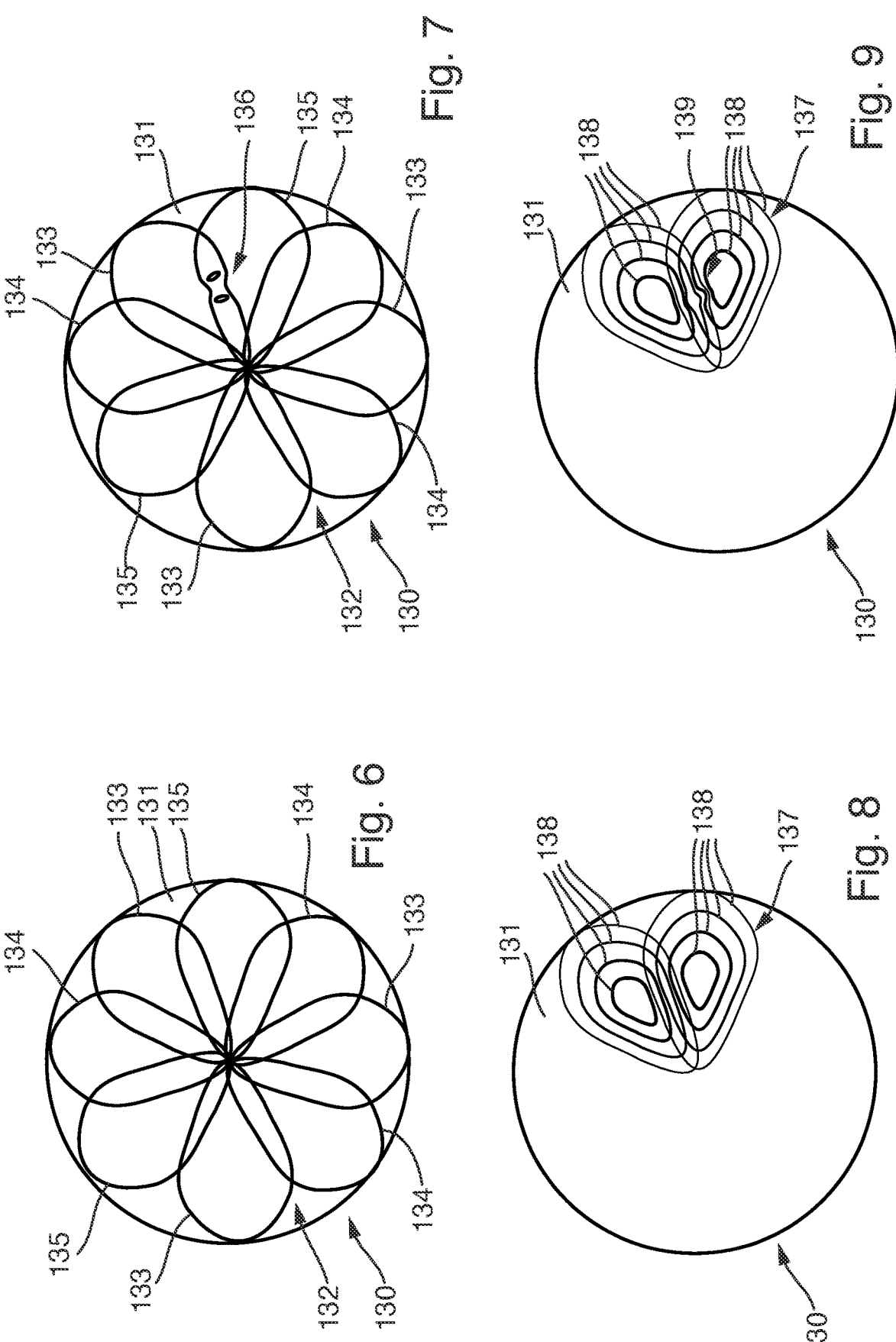
FIG. 6 shows a detection surface with a light pattern.
FIG. 7 shows a detection surface with another light pattern.
FIG. 8 shows a detection surface with intensity lines.
FIG. 9 shows a detection surface with other intensity lines.

FIG. 6 shows a light pattern 132 on a detection surface 131 of the image sensor 130. The detection surface 131 typically comprises a plurality of pixels, which are not shown in FIG. 6.

As shown in FIG. 6, the exemplary light pattern 132 comprises eight light spots denoted with reference signs 133, 134, 135. The light spots 133, 134, 135 have, at least approximately, an oval shape. Three light spots 133 originate from light sources having a first color, e.g., blue. Three light spots 134 originate from light sources having a second color, e.g., red. Two light spots 135 originate from light sources having a third color, e.g., green. It is to be noted that the number of eight light spots 133, 134, 135 having three different colors is only for illustrative purposes here and that any other number of light spots and colors can be used. Especially, each light spot 133, 134, 135 may correspond to one light source 164 in such a way that light emitted from the light source 164 propagates in a cone shape through the interior space 12, is reflected at the reflective surface 230 and propagates further to the detection surface 131.

FIG. 6 shows a light pattern 132 that is typical for a non-deformed state. In other words, such a light pattern 132 may be seen by the detection surface 131 if no force is applied on the measurement surface 220. For example, any force inference means, which can be a neural network, may be trained such that it detects that no force is applied when the light pattern 132 of FIG. 6 is detected by the image sensor 130.

FIG. 7 shows a further light pattern 132 on a detection surface 131. The light pattern 132 of FIG. 7 corresponds to a state in which a force is applied on the measurement surface 220. As can be seen, two of the light spots 133, 135 now have a deformed portion 136 where there is a local color change due to different reflective properties of the reflective surface 230 inside to the applied force. The situation of FIG. 7 can trigger an inference that a force has been applied. Especially the change in the light pattern 132 is characteristic not only for a strength of a force, but also for its location, direction and for shape and size of an indenter applying the force. The same is true for two or more forces that can be applied simultaneously.

FIG. 8 shows schematically intensity lines 138 of an intensity pattern 137 on the detection surface 131. Each of the intensity lines 138 corresponds to a line of constant light intensity on the detection surface 131. FIG. 8 shows a non-deformed state, corresponding to the state shown in FIG. 6. FIG. 9 shows a deformed state, in which the intensity lines 138 have a deformation zone 139 with different intensity due to locally different reflective properties of the reflective surface 230. This is also characteristic for an applied force and can thus be used for force inference.

FIG. 10 shows purely schematically the image sensor 130 with its detection surface 131 positioned between the light source arrangement 160 with its support ring 162 and its light sources 164 together with the collimator ring 175 with its collimators 170.

As shown, light emitted from the light sources 164 passes through the collimators 170 and further propagates to the interior space 12 in respective cones 166. These cones 166 are defined by a central propagation direction 167, that can also be regarded as a cone axis, and by outer cone angles 168 that define the maximal extent of the light in horizontal direction relative to the central propagation direction 167. As shown, the collimators 170 are positioned slightly outwards relative to a point at which light is emitted from the light sources 164 so that the central propagation directions 167 is not vertical, but slightly directed outwards. This ensures that an oversaturation in a tip of the top portion 200 is prevented. With this implementation, a defined light structure can be obtained inside the interior space 12. Light reflected from the reflective surface 230, which is not shown in FIG. 8, may propagate to the detection surface 131 and may be detected for force inference.

FIG. 11 shows a mold 600 for fabricating a top portion for the sensor arrangement 10. The mold 600 comprises a mold body 620, in which an opening 610 is formed. FIG. 12 shows a further mold 605, which also has a mold body 620 with an opening 610 formed in it. When the mold 600 and further mold 605 are put together there is only one opening 610 remaining. The opening 610 may be used to fabricate a top portion 200 by overmolding a skeleton 240.

FIG. 11 shows a state in a production process of a top portion 200. Skeleton 240 is put in the opening 610. The further mold 605, which is shown in FIG. 12, will be used in order to form one single opening 610. The skeleton 240 will be overmolded by a wall material in order to form a wall 210 surrounding the skeleton 240.

The outside of the wall 210 to be formed, which will later be the measurement surface 220, is defined by the opening 610. In other words, the measurement surface 220 will adapt to the shape of the opening 610.

For defining an inside shape, which will later be the reflective surface 230, a cast 700 can be used. Possibly embodiments of casts 700 are shown in FIGS. 13 to 17.

Figure 13:
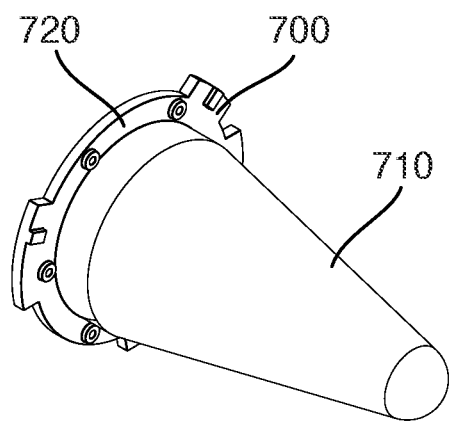
FIGS. 13-17 show different versions of casts.

FIG. 13 shows a cast 700 according to a first embodiment. The cast 700 comprises a support ring 720. From the support ring 720, a main portion 710 extends with a round cross section that diminishes towards a tip. In the embodiment of FIG. 13, the main portion 710 has a flat outer surface, so that a flat reflective surface 230 is formed when the cast 700 is used inside the skeleton 240 shown in FIG. 11 to define the inside reflective surface 230 of a wall 210.

Figure 14:
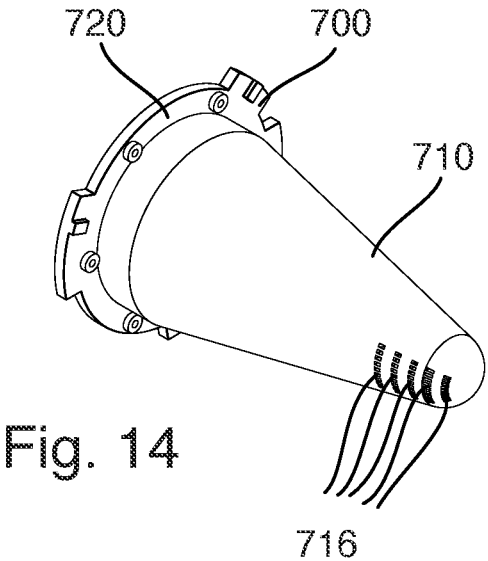

FIG. 14 shows a cast 700 according to a second embodiment. In contrast to the embodiment shown in FIG. 13, the cast 700 of FIG. 14 has a plurality of recesses 716 which can be used to provide for a specific complementary structure on the reflective surface 230. The recesses 716 form complementary protrusions in the reflective surface 230, which may increase a change in a light pattern 132 more significantly. As shown in FIG. 14, the recesses 716 are positioned nearby the tip of the main portion 710. For example, the recesses 716 may be applied to a thinned section 250 of the wall 210 as shown in FIG. 5.

Figure 15:
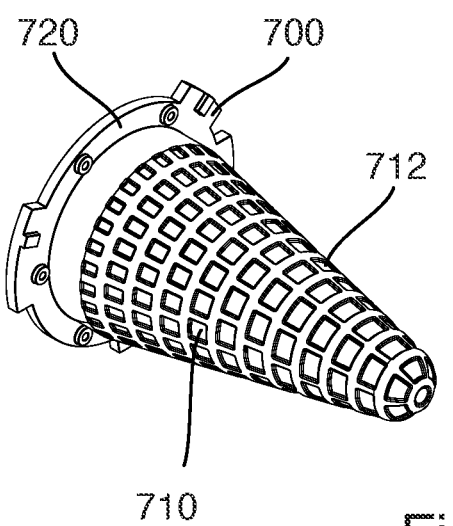

FIG. 15 shows a cast 700 according to a third embodiment. In the embodiment of FIG. 15, the cast 700 has an outer grid structure 712. This outer grid structure 712 leads to a complementary structure on the reflective surface 230. This leads to increased force detection capabilities in many situations.

Figure 16:
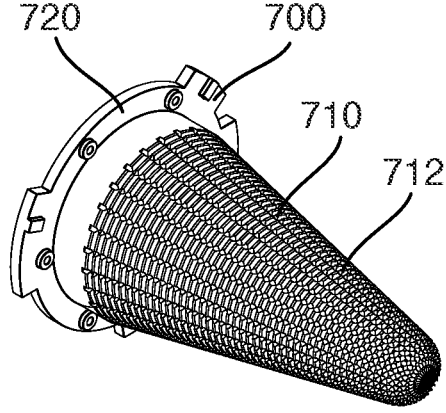

FIG. 16 shows a cast 700 according to a fourth embodiment, which is embodied similar to the embodiment of FIG. 15, but has a finer grid structure 712.

Figure 17:
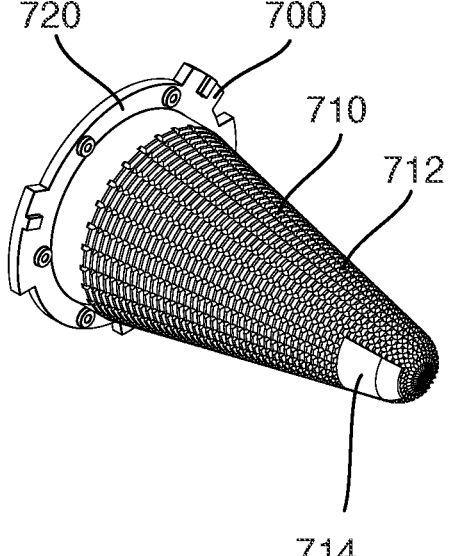

FIG. 17 shows a cast 700 according to a sixth embodiment. In addition to the outer grid structure 712 or FIG. 16, the embodiment shown in FIG. 17 has a flat portion 714 which does not have a grid structure. The flat portion 714 is also positioned near the tip. It leads to a locally flat reflective surface 230. Such a locally flat reflective surface 230 can, for example, be applied at the thinned section 250.

Figure 18:
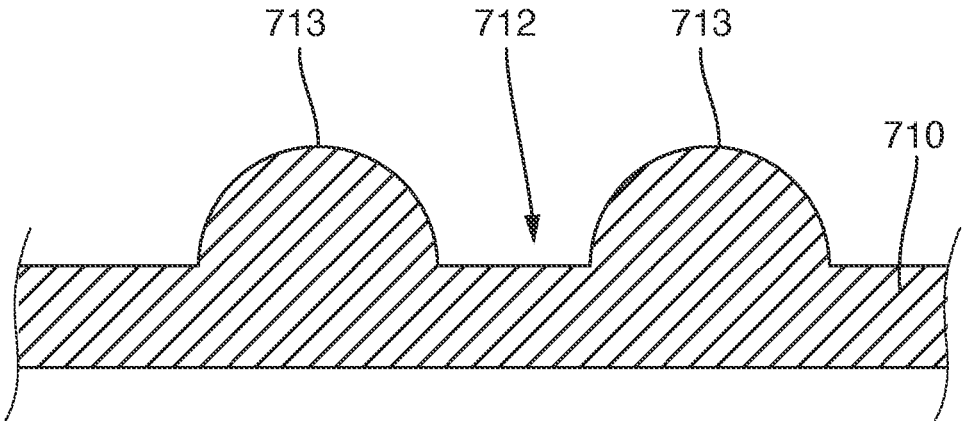
FIG. 18 shows a profile of a cast.

FIG. 18 shows a typical profile of a cast 700 as shown, for example, in FIG. 16. The profile comprises the outer grid structure 712 with protrusions 713. Between the protrusions 713, there is a flat region which also leads to a flat region in the reflective surface 230. The protrusions 713 have, in the shown embodiment, the outer shape of a halve circle. For example, the distance between the protrusions 713 may be at least 0.1 mm, at least 0.5 mm, at least 1 mm, or at least 2 mm. The distance between the protrusions 713 may be at most 0.5 mm, at most 1 mm, at most 2 mm, or at most 5 mm. Thus, it may be from submillimeter to several millimeters. For the radii of the protrusions 713 the same values or ranges may be applied. However, also other values can be used.

Figure 19:
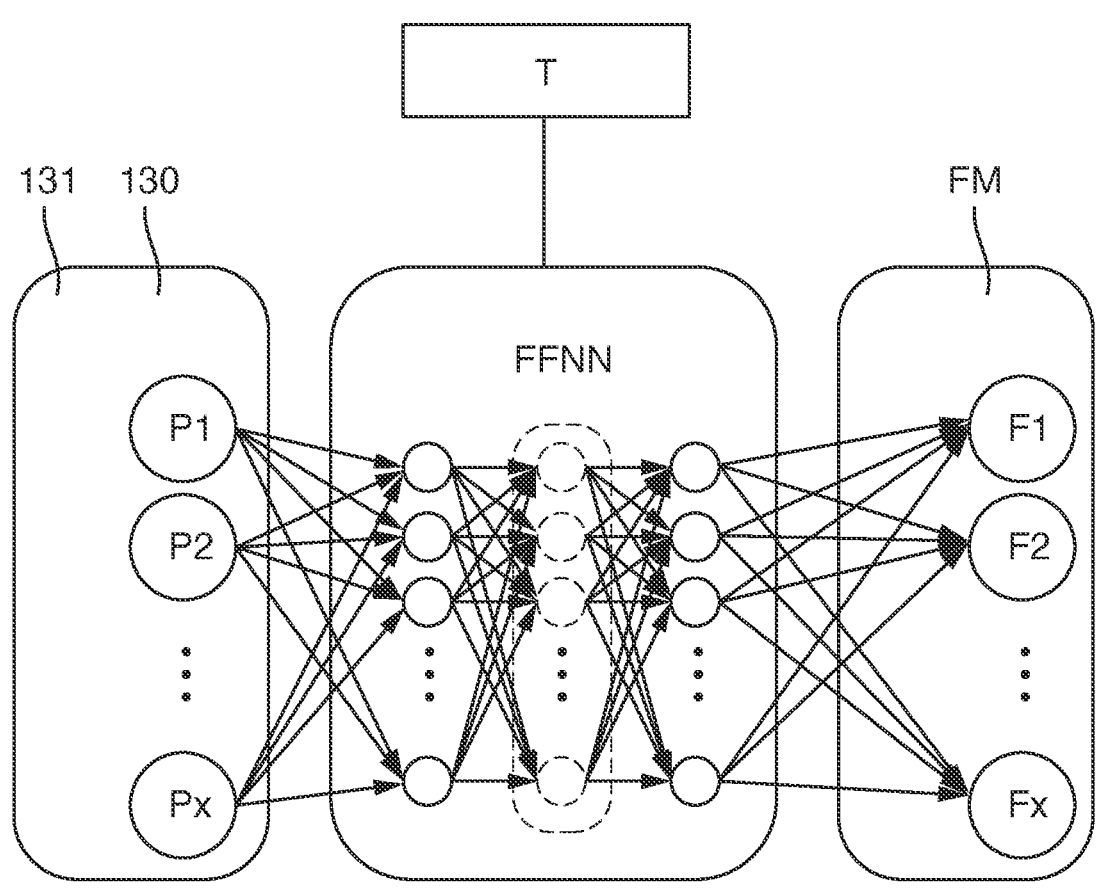
FIG. 19 shows generation of a force map.

FIG. 19 shows a schematic overview of a force inference.

As already mentioned above, the image sensor 130 comprises a detection surface 131. The detection surface 131 has a plurality of pixels P. They are denoted with P1, P2, ... Px. Each pixel P is able to detect light that impinges on the pixel individually in a color-sensitive manner. Thus, a light pattern 132 on the image sensor 130 can be detected.

The output data of the image sensor 130 is fed into a feed-forward neural network FFNN. This is an artificial neural network that maps image data from the image sensor 130 to a force map FM. The force map FM comprises a plurality of force vectors F1, F2, ... Fx. The force vectors F of the force map FM will be explained further below.

The feed-forward neural network FFNN may be trained by a training method T. A suitable training will be described further below with reference to FIG. 20.

In principle, the feed-forward neural network FFNN is able to detect forces out of the image data received from the image sensor 130. This may be enhanced by machine-learning techniques. It has been proven that a suitable trained feed-forward neural network FFNN is able to infer position, amplitude, and direction of forces and even shape and size of indenters. Such an inference is even possible when a plurality of forces are applied simultaneously.

To enhance force inference, further image data with a non-deformed view of an illuminated reflective surface, a greyscale gradient image, and/or an image of the skeleton can be put into the feed-forward neural network FFNN in each case a force inference and/or a training step should be done.

Figures 20, 21:
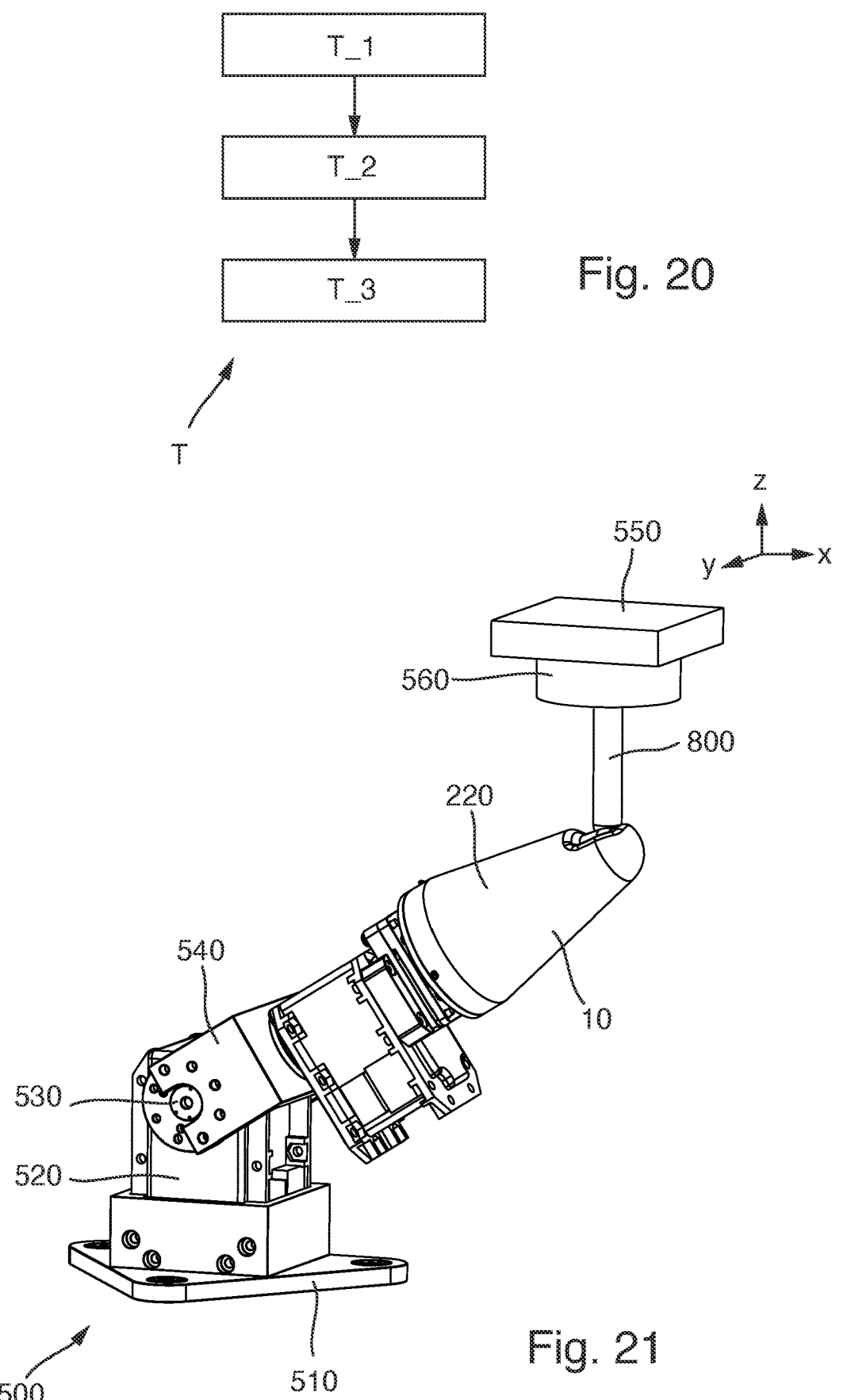
FIG. 20 shows a method for generating a force map.
FIG. 21 shows a force test arrangement.

FIG. 20 shows a method T for training a feed-forward neural network FFNN.

In a first step T_1, a plurality of force tests with a sensor arrangement 10 are performed, as will be further described with reference to FIG. 21. In each force test an applied force is measured and furthermore a position of the force on the measurement surface 220 is measured. Furthermore, image data corresponding to a light pattern 132 is read out from the image sensor 130.

In a second step T_2, a plurality of simulations are made such that each simulation corresponds to one force test. Each simulation is made with a model of the sensor arrangement 10 that simulates the behavior of the components, especially of the wall 210, when a force is applied. Thus, a simulated force map FM' is calculated in each simulation.

In a third step T_3, the feed-forward neural network FFNN is trained with the image data of the force tests, and with the simulated force maps FM' calculated in the corresponding simulations. In detail, each training substep may comprise training the feed-forward neural network with a light pattern 132 and the corresponding simulated force map FM'. Thus, the feed-forward neural network FFNN learns how to map a light pattern 132 to a force map FM.

It is to be noted that the simulated force map FM' is only present in a simulation based on a model of the sensor arrangement 10. The force map FM is present on a real measurement surface 220.

FIG. 21 shows a force test arrangement 500 for performing force tests. The force test arrangement 500 comprises a base 510. On the base 510, a first arm 520 is located, which is connected with an articulation 530. At the articulation 530, a second arm 540 is positioned. The first arm 520 may be rotated on the base 510 and the second arm 540 may be swung round the articulation 530 by electrical drive means that are not shown.

On the second arm 540, there is mounted a sensor arrangement 10 as described above. It may be rotated around an axis of the second arm 540. The sensor arrangement 10 may thus be positioned by the force test arrangement 500.

There is also a top portion 550, at which a force sensor 560 is mounded. The force sensor 560 is connected with an indenter 800. The indenter 800 remains in a substantially unchanged position. With the force test arrangement 500, the sensor arrangement 10, especially its measurement surface 220, can be brought in contact with the indenter 800, so that a force can be applied. This force can be measured by the force sensor 560.

In a preferred implementation the arms 520, 540 are used in order to select an intended position on the measurement surface 220 at which the indenter 800 should be brought into contact with the measurement surface 220. The indenter 800 may then be moved by moving the top portion 550 in three dimensions, thus applying a force on the measurement surface 220 that may have both a normal component and shear force components. The sensor arrangement 10 may be left in place during that force application. However, also other implementations of a force test are possible, especially with regard to the movement of parts. For example, the top portion 550 may be moved at the same time as the arms 520, 540. Also, only the arms 520, 540 may be used in order to apply a force.

The position at which an indenter 800 contacts the measurement surface 220 may be calculated using machine parameters or a kinematic model. However, it may also be observed by a camera.

Figures 22, 23:
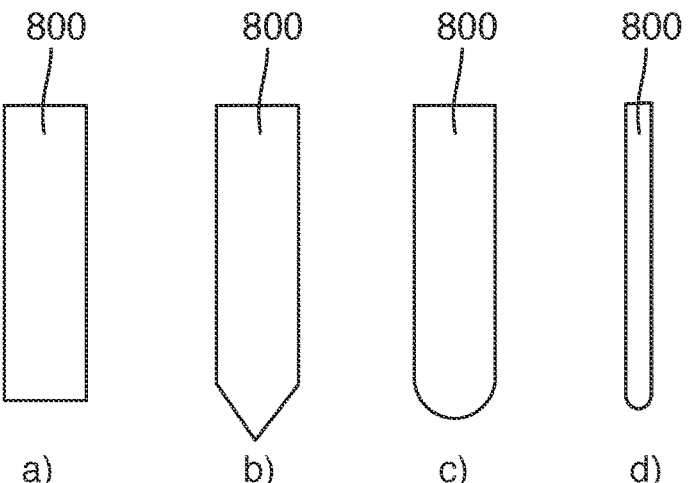
FIG. 22 shows possible indenters.
FIG. 23 shows a force map.

FIG. 22 schematically shows shapes of four different indenters 800, which can be physical indenters 800 for usage in a force test arrangement 500, or which can be simulated indenters 800' in simulation as described further below with respect to FIG. 24.

FIG. 22a shows an indenter 800 having a flat shape at its contact portion to the measurement surface 220. FIG. 22b shows an indenter 800 having a tip shaped contact portion. FIG. 22c shows an indenter 800 having a contact portion shaped like a hemisphere. FIG. 22d shows an indenter 800 having the same type of contact portion as the indenter 800 shown in FIG. 22c but having a smaller size. Using such different indenters 800 can optimize training of the feed-forward neural network FFNN with respect to such different shapes, meaning that the capabilities of the feed-forward neural network FFNN trained with such different indenters 800 are increased with respect to reconstructing forces applied by indenters 800 with different indenter shapes. Stated differently as an example, a force map FM reconstructed after application of an indenter 800 with a flat shape will be different from a force map FM reconstructed after application of an indenter 800 having a hemispherical shape.

FIG. 23 shows the sensor arrangement 10 with a schematic illustration of a force map FM. The force map FM comprises a plurality of force vectors F, which are positioned all around the measurement surface 220. While two force vectors F are shown in FIG. 23, much more force vectors F can be used in typical implementations. For example, 1 force vector F per mm2 can be used in an exemplary implementation.

Each force vector F has a normal force component FN, a first shear force component FS1 and a second shear force component FS2. The normal force component FN gives the value of a normal force of an applied force, i.e., the component perpendicular to a local orientation of the measurement surface 220. The shear force components FS1, FS2 give the values of shear forces applied on the measurement surface 220 at the respective point. Shear forces are typically parallel to the local orientation of the measurement surface 220 and are typically perpendicular to each other and to the normal force. This may especially relate to a non-deformed orientation of the measurement surface 220 which may define the orientation of the force vectors F, especially of its normal components.

Thus, each force vector F gives a strength and orientation of a force applied on a specific point on the measurement surface 220. Such a force can, for example, originate from an indenter 800, whereas one such indenter 800 is shown as an example in FIG. 23. As it applies a force, the measurement surface 220 is slightly deformed.

It should be noted that also other definitions of a force vector F can be used, for example only a normal force component can be evaluated, or the shear forces can have alternative definitions.

Figure 24:
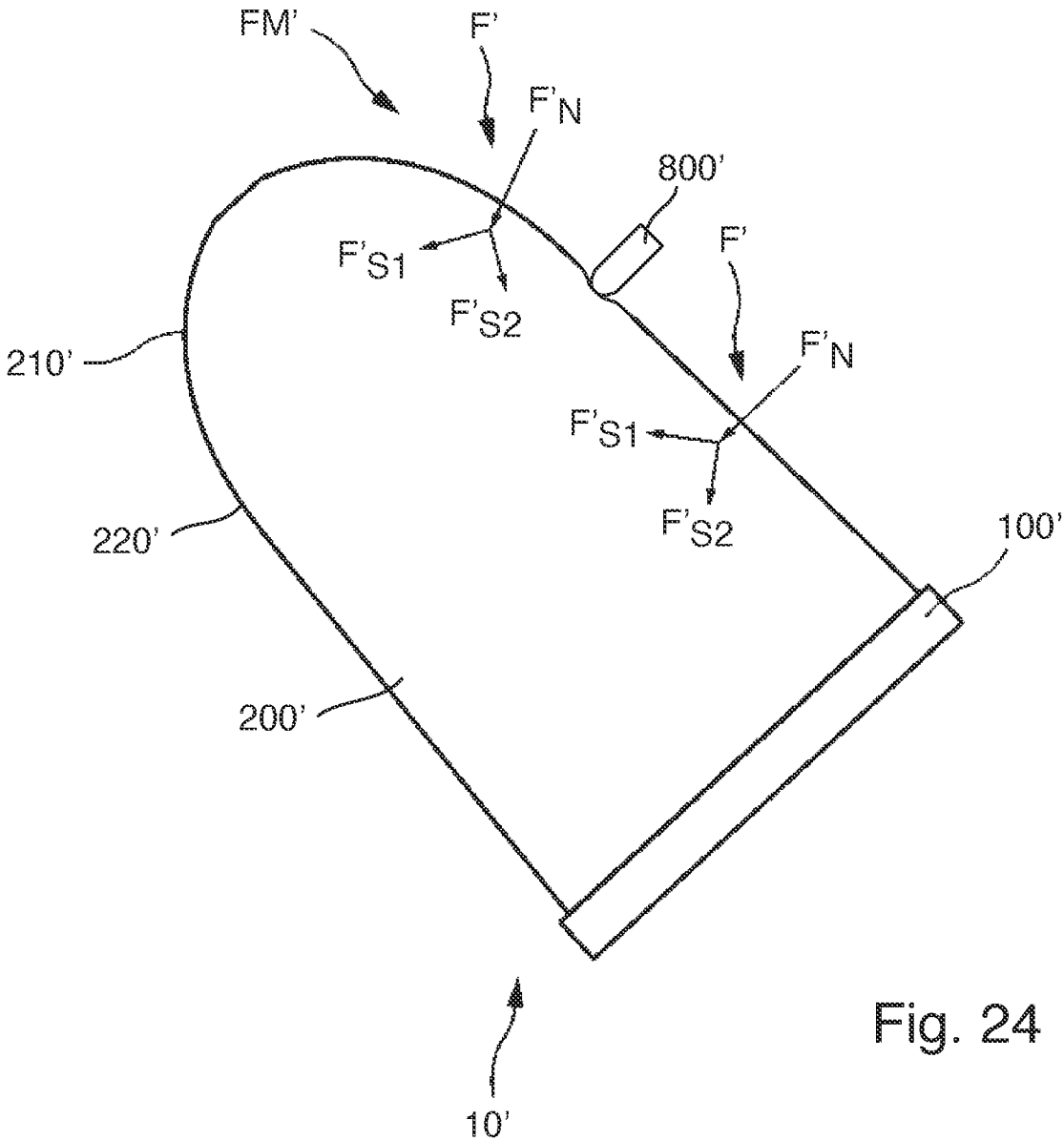
FIG. 24 shows a simulated force map.

FIG. 24 shows a corresponding case with a simulated force map FM'. Reference signs are denoted with an apostrophe ('). In case of a simulated force map FM', the simulated force vectors F' of such a simulated force map FM' on a simulated measurement surface 220' may have respective simulated components, for example a normal force component F'N, a first shear force component F'S1 and a second shear force component F'S2. Such simulated force maps FM' are especially calculated in the simulations performed on the model as described above.

There is also a simulated indenter 800' shown in FIG. 24. The simulated indenter 800' is applied in a simulation with the same magnitude and direction and on the same position as the real indenter 800 in the corresponding force test. Using a model, the simulated force map FM' is calculated and is then used for training the feed-forward neural network FFNN.

Mentioned steps of the inventive method can be performed in the given order. However, they can also be performed in another order, as long as this is technically reasonable. The inventive method can, in an embodiment, for example with a certain combination of steps, be performed in such a way that no further steps are performed. However, also other steps may be performed, including steps that are not mentioned.

It is to be noted that features may be described in combination in the claims and in the description, for example in order to provide for better understandability, despite the fact that these features may be used or implemented independent from each other. The person skilled in the art will note that such features can be combined with other features or feature combinations independent from each other.

References in dependent claims may indicate preferred combinations of the respective features, but do not exclude other feature combinations.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items.

Other terms are to be construed using their broadest reasonable meaning unless they are used in a context that requires a different interpretation.

LIST OF REFERENCE NUMERALS

10 sensor arrangement
12 interior space
100 base portion
110 support structure
120 printed circuit board
130 image sensor
131 detection surface
132 light pattern
133 light spot
134 light spot
135 light spot
136 deformed portion
137 light intensity pattern
138 intensity lines
139 deformation zone
140 wide angle lens
150 mounting structure
152 screws
160 light source arrangement
162 support ring
164 light sources
166 cones
167 central propagation direction
168 outer cone angles
170 collimator
175 collimator ring
200 top portion
210 wall
220 measurement surface
230 reflective surface
240 skeleton
242 bottom ring
244 grid
246 protrusions
248 main part
249 fingernail section
250 thinned section
255 edge
500 force test arrangement
510 base
520 first arm
530 articulation
540 second arm
550 top portion
560 force sensor
600 mold
605 further mold
610 opening
620 mold body
700 cast
710 main portion
712 grid structure
713 protrusions
714 flat portion
716 recesses
720 support ring
800 indenter
P pixel
FFNN feed-forward neural network
FM force map
T training method F force vector $F_N$ normal component $F_S$ shear force component Apostrophe: elements of simulation

The invention claimed is:

1. Sensor arrangement for sensing forces, comprising a base portion, a top portion comprising an elastically deformable wall, the top portion being mounted on the base portion such that the top portion and the base portion define an interior space, the elastically deformable wall comprising an outside measurement surface and an inside reflective surface being separated by the wall from the outside measurement surface, wherein the inside reflective surface partially delimits the interior space, a light source arrangement comprising a plurality of light sources being mounted on the base portion and arranged to emit light towards the inside reflective surface, and a two-dimensional image sensor comprising a detection surface viewing at least a part of the inside reflective surface.

2. Sensor arrangement according to claim 1, wherein each light source of the plurality of light sources has a respective color, and wherein the light source arrangement comprises light sources of the plurality of light sources having at least two or three different colors.

3. Sensor arrangement according to claim 1, wherein the plurality of light sources and the detection surface are arranged such that light emitted by the plurality of light sources and reflected by the inside reflective surface generates a light pattern on the detection surface.

4. Sensor arrangement according to claim 1, wherein a light pattern on the detection surface and/or a color distribution of light reflected from the inside reflective surface on the detection surface changes with deformation of the outside measurement surface.

5. Sensor arrangement according to claim 1, wherein the inside reflective surface is diffuse reflective.

6. Sensor arrangement according to claim 1, wherein the image sensor is mounted on the base portion and/or in the interior space.

7. Sensor arrangement according to claim 1, wherein the plurality of light sources are arranged surrounding the image sensor.

8. Sensor arrangement according to claim 1, wherein the sensor arrangement comprises a plurality of collimators, each collimator of the plurality of collimators being assigned to a light source of the plurality of light sources and defining a respective angle of radiation and/or a cone of emitted light.

9. Sensor arrangement according to claim 8, wherein one, some or all collimators of the plurality of collimators are positioned acentric with respect to the assigned light source.

10. Sensor arrangement according to claim 8, wherein the plurality of collimators are embodied as holes in a collimator ring.

11. Sensor arrangement according to claim 1, wherein the interior space is a hollow space.

12. Sensor arrangement according to claim 1, wherein the plurality of light sources and/or the plurality of collimators are configured to emit light in respective cones.

13. Sensor arrangement according to claim 12, wherein one, some or all cones have a cone axis being inclined by more than 0° outwards relative to a common axis and/or relative to an axis normal to the base portion; and/or wherein one, some or all cones have a cone axis being inclined by at most 10° outwards relative to a common axis and/or relative to an axis normal to the base portion.

14. Sensor arrangement according to claim 1, wherein the inside reflective surface is covered by a pattern and/or several trackable objects.

15. Sensor arrangement according to claim 1, wherein the inside reflective surface is a smooth surface.

16. Sensor arrangement according to claim 1, wherein the elastically deformable wall is configured to relay deformations from the outside measurement surface to the inside reflective surface.

17. Sensor arrangement according to claim 1, wherein the top portion is releasably mounted on the base portion.

18. Sensor arrangement according to claim 1, wherein the top portion comprises a skeleton positioned inside the elastically deformable-wall.

19. Sensor arrangement according to claim 1, wherein the elastically deformable wall comprises a thinned section having a lower thickness than the rest of the elastically deformable wall.

20. Method for fabricating a top portion for a sensor arrangement, the method comprising the following steps:

providing a skeleton made of a skeleton material, the skeleton surrounding an interior space, and covering the skeleton with a wall material such that the wall material forms an elastically deformable wall defining an outside measurement surface and an inside reflective surface being separated by the wall from the outside measurement surface, wherein the inside reflective surface delimits the interior space, and wherein the skeleton is positioned between the inside reflective surface and the outside measurement surface.

21. Method for fabricating a sensor arrangement, the method comprising the following steps:

providing a base portion, fabricating a top portion having an interior space, mounting a light source arrangement comprising a plurality of light sources on the base portion, mounting a two-dimensional image sensor on the base portion, and covering the base portion with the top portion such that the plurality of light sources are arranged to emit light towards the interior space and that the image sensor is positioned in the interior space;

wherein the top portion is fabricated according to the following steps:

providing a skeleton made of a skeleton material, the skeleton surrounding the interior space, and covering the skeleton with a wall material such that the wall material forms an elastically deformable wall defining an outside measurement surface and an inside reflective surface being separated by the wall from the outside measurement surface, wherein the inside reflective surface delimits the interior space.

* * * * *